United States Patent
Kamizuma et al.

(10) Patent No.: US 9,583,264 B2
(45) Date of Patent: Feb. 28, 2017

(54) CAPACITOR DEVICE AND ELECTRICAL POWER CONVERSION DEVICE

(71) Applicant: Hitachi, Ltd., Chiyoda-ku, Tokyo (JP)

(72) Inventors: Hiroshi Kamizuma, Tokyo (JP); Kinya Nakatsu, Tokyo (JP); Junpei Kusukawa, Tokyo (JP); Takeshi Tokuyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 14/198,014

(22) Filed: Mar. 5, 2014

(65) Prior Publication Data

US 2014/0286064 A1 Sep. 25, 2014

(30) Foreign Application Priority Data

Mar. 22, 2013 (JP) ................. 2013-060494

(51) Int. Cl.
| | |
|---|---|
| H01G 4/32 | (2006.01) |
| H01G 2/20 | (2006.01) |
| H01G 4/258 | (2006.01) |
| H01G 2/08 | (2006.01) |
| H01G 4/224 | (2006.01) |
| H01G 4/228 | (2006.01) |
| H02M 7/00 | (2006.01) |

(52) U.S. Cl.
CPC .............. *H01G 4/258* (2013.01); *H01G 2/08* (2013.01); *H01G 4/224* (2013.01); *H01G 4/228* (2013.01); *H02M 7/003* (2013.01); *Y02T 10/7022* (2013.01)

(58) Field of Classification Search
USPC ....... 361/301.5, 306.1, 308.1, 323, 328–329, 361/282, 273
See application file for complete search history.

(56) References Cited

U.S. PATENT DOCUMENTS

| 2009/0243443 | A1 | 10/2009 | Aoki et al. | |
| 2010/0155158 | A1* | 6/2010 | Azuma | B60K 6/48 180/65.8 |
| 2014/0140119 | A1 | 5/2014 | Shinohara et al. | |

FOREIGN PATENT DOCUMENTS

| JP | 27-8538 | 10/1952 |
| JP | 52-24517 | 2/1977 |

(Continued)

OTHER PUBLICATIONS

Japanese Office Action issued in counterpart Japanese Application No. 2013-060494 dated Jul. 28, 2015 with English-language translation (eight (8) pages).

(Continued)

*Primary Examiner* — Eric Thomas
(74) *Attorney, Agent, or Firm* — Crowell & Moring LLP

(57) ABSTRACT

A capacitor device includes: a film capacitor element that has a coiled body in which an insulating layer and an electrification layer are laminated and wound together, and a pair of collector electrodes that are formed upon two opposite end faces of the coiled body; a case that has a capacitor housing portion within which the film capacitor element is received; a pair of inserts having insulation properties, one of which is inserted between one of the pair of collector electrodes and one of inner walls of the capacitor housing portion; and a mass of sealing and insulating material that is charged between the film capacitor element and the one of the inner walls of the capacitor housing portion.

10 Claims, 17 Drawing Sheets

(56) References Cited

FOREIGN PATENT DOCUMENTS

| JP | 56-51340 U | 5/1981 |
|---|---|---|
| JP | 57-936 U | 1/1982 |
| JP | 58-97825 U | 7/1983 |
| JP | 59-29024 U | 2/1984 |
| JP | 2006-196680 A | 7/2006 |
| JP | 2009-247119 A | 10/2009 |
| JP | 2010-40832 A | 2/2010 |
| JP | 2011-67093 A | 3/2011 |
| JP | 2012-105541 A | 5/2012 |
| JP | 2013-27203 A | 2/2013 |

OTHER PUBLICATIONS

Japanese Office Action issued in counterpart Japanese Application No. 2013-060494 dated Dec. 15, 2015, with unverified English translation (six (6) pages).

\* cited by examiner

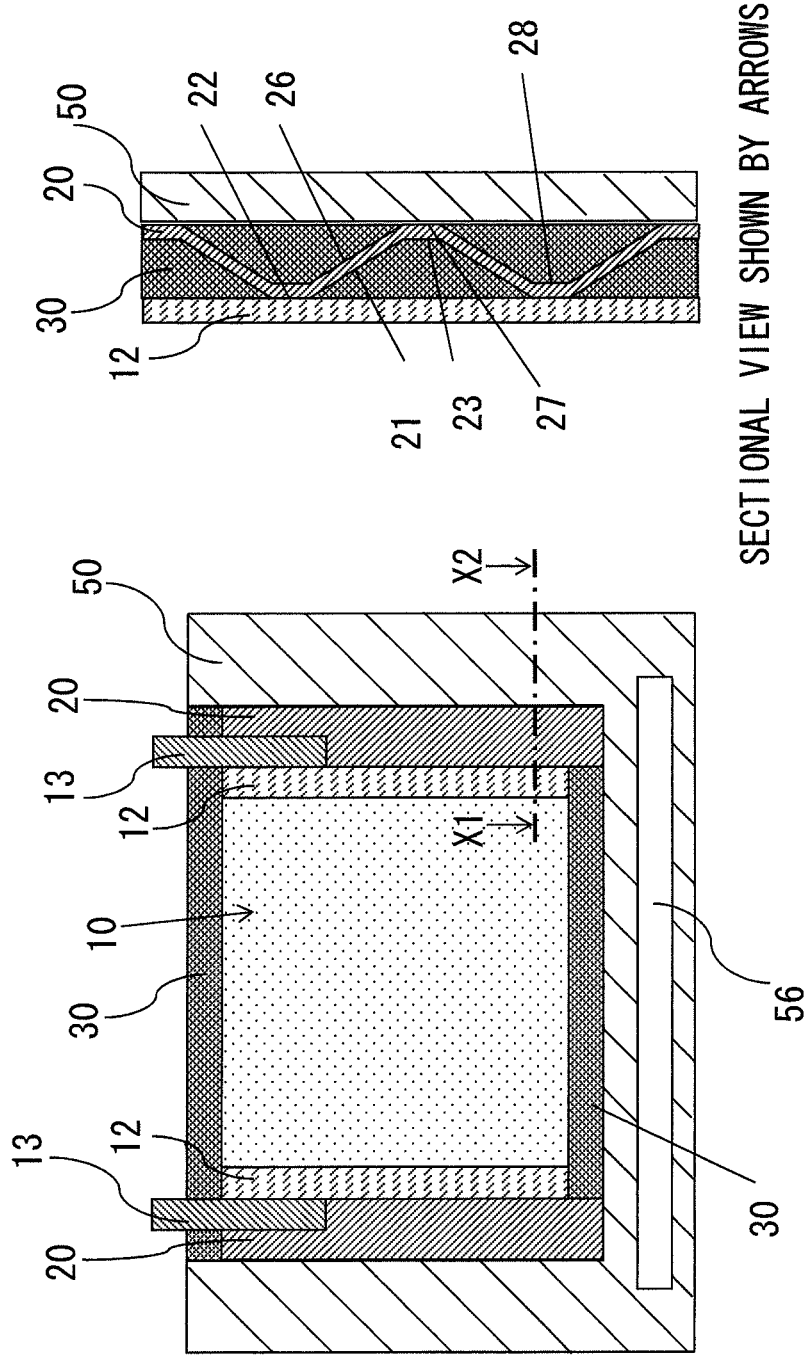

BEFORE INSERTION OF FILM CAPACITOR ELEMENT SECTIONAL VIEW SHOWN BY ARROWS X1-X2

AFTER INSERTION OF FILM CAPACITOR ELEMENT SECTIONAL VIEW SHOWN BY ARROWS X1-X2

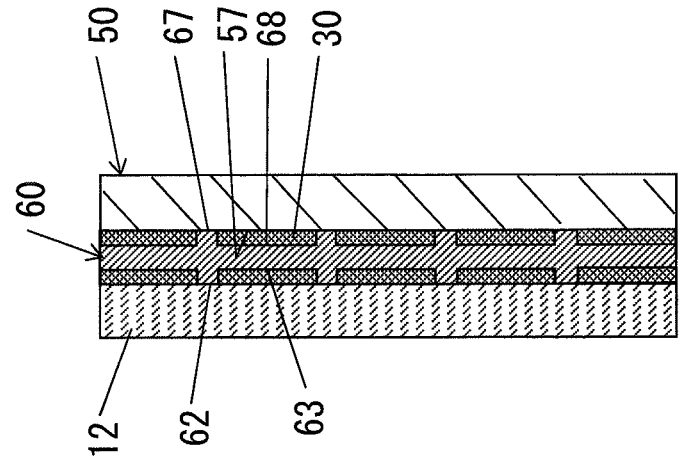
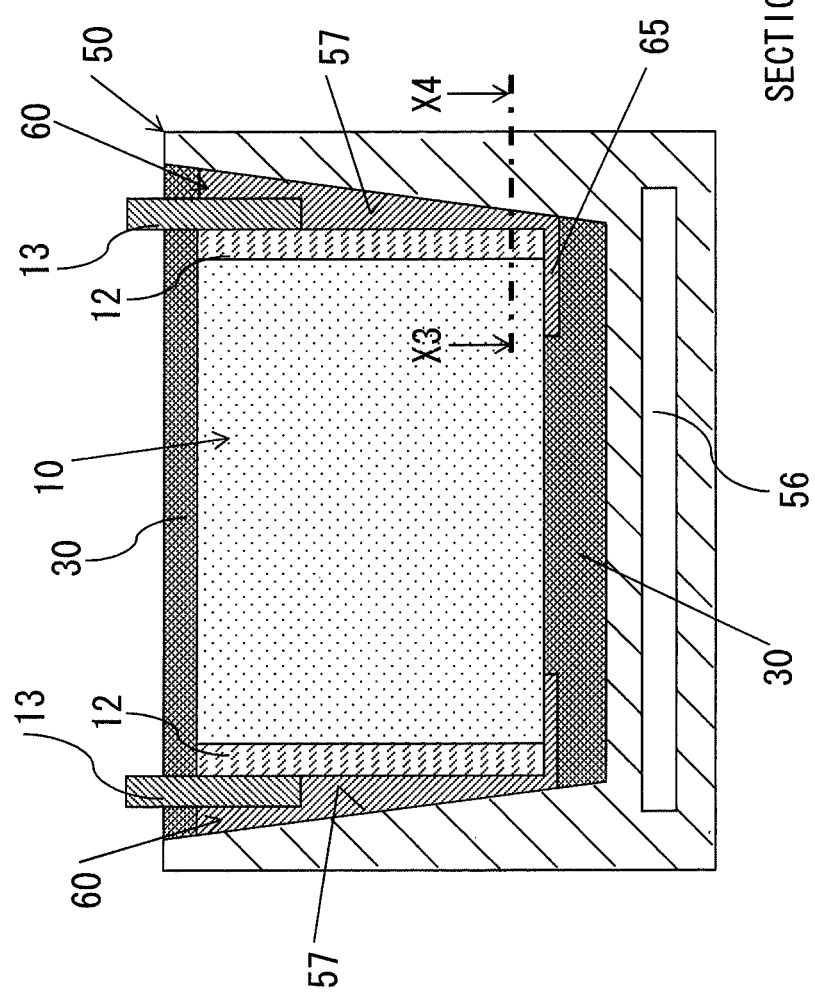
FIG. 6A
FIG. 6B
SECTIONAL VIEW SHOWN BY ARROWS X3-X4

CAPACITOR DEVICE AND ELECTRICAL POWER CONVERSION DEVICE

INCORPORATION BY REFERENCE

The disclosure of the following priority application is herein incorporated by reference: Japanese Patent Application No. 2013-060494, filed Mar. 22, 2013.

BACKGROUND OF INVENTION

1. Field of the Invention

The present invention relates to a capacitor device and to an electrical power conversion device.

2. Description of Related Art

For some years now, the market for hybrid automobiles (HEV: Hybrid Electric Vehicle) and for electric automobiles (EV: Electric Vehicle) has seen rapid spread and development, and as a result there have been greater and greater demands upon electrical equipment for HEVs, such as batteries, inverters, motors and so on, in terms of requirements for higher output, better compactness, and lower cost. In particular, there are great demands upon inverter devices to be used for HEVs and EVs for increase in voltage, higher density, and better compactness, in order to implement lower fuel consumption, reduction of electrical power consumption, and reduction of the space occupied.

Apart from incorporating a power module that contains power semiconductor elements such as IGBTs or the like and bus bars and so on, an inverter device is assembled from components such as capacitors (DC-link capacitors) for smoothing DC power and so on. In particular, as a capacitor for an inverter device for an HEV or an EV, since the voltage that is used is several hundreds of volts, in many cases a film capacitor having high withstand voltage is principally used. Apart from film capacitors being distinguished by having high withstand voltage, the fact that, unlike other types of capacitor, they have the strong points of low loss, a long maintenance free life, and the self-healing characteristic consisting of the capability to recover by themselves when their film insulation has broken down, may also be advanced as reasons why they are often employed in HEVs and EVs.

Generally, film capacitors are made by vapor depositing a metal such as aluminum or the like upon at least one surface of an organic dielectric film made from PET (polyethylene terephthalate), PP (polypropylene), or the like, thus producing a metallized film, winding up two superimposed layers of this metallized film, and manufacturing two metallikon electrodes by metallizing the end surfaces of the wound up capacitor element with a metal such as aluminum or zinc, in order to bring electrodes out to the exterior.

In a capacitor device for an inverter device for an HEV or an EV, for example, terminals for electrical connection to other components are connected to these metallikon electrodes at the two ends of the film capacitor element by welding or soldering or the like. In many cases, the film capacitor element is then housed in a resin case that is made from PPS (polyphenylene sulfide) resin, PBT (polybutylene terephthalate) resin, or the like, and the space between the resin case and the film capacitor element is sealed with an insulating and sealing resin (i.e. a potting resin) such as epoxy resin, urethane resin, or the like, whereby a sealed capacitor module is manufactured. The insulating and waterproof characteristics of this film capacitor element are ensured by the resin case and the potting resin.

A capacitor device in which a case made from resin is used is light in weight and is excellent in heat resistance, but, under conditions in which the output electrical current is large and high ripple currents flow in the capacitor, the generation of heat by the internal capacitor element becomes high, and, due to the resin material from which the case and the potting are manufactured, this heat accumulates in the interior of the capacitor device, so that there is a danger of deterioration of its electrical characteristics such as its breakdown voltage and so on. On the other hand, it is per se known to manufacture the case from an electrically conductive metallic material and to flow potting resin into the space between the capacitor element and the case, so that a good insulating characteristic and a good heat dissipation characteristic can both be obtained. In other words, it is per se known to manufacture a capacitor device by inserting the capacitor element into a case that is made from metal while orienting the metallikon electrodes on opposite sides of the capacitor element towards the opening at the top of the case and towards the bottom surface of the case, and by potting a resin material that has high thermal conductivity into the case between its bottom surface and the lower side of the lower metallikon electrode, while potting a resin material that has high mechanical strength into the other spaces between the case and the capacitor element. With this capacitor device, it is possible to dissipate heat generated by the capacitor element to the metallic case via the high thermal conductivity resin layer that is formed in the lower portion of the case (refer to Patent Document Japanese Laid-Open Patent Publication 2006-196680).

SUMMARY OF INVENTION

With the capacitor device described in the above Patent Document, the characteristic for dissipation of heat to the case is enhanced by charging the resin material that has high thermal conductivity into the gap between that one of the electrodes, among the two electrodes on opposite sides of the film capacitor element, that faces the bottom surface of the case and a portion of the outer circumferential surface of the wound up film capacitor element, and the inner surface of the bottom of the case. However, with the capacitor device described in the above Patent Document, the enhancement of the performance for dissipation of heat generated within the film capacitor element to the case only relates to that electrode at one of its sides, among the two electrodes at the two sides of the film capacitor element, from both of which it would be desirable to dissipate heat. Due to this, there is a danger that the cooling of the film capacitor element will not be sufficient.

According to the 1st aspect of the present invention, a capacitor device, comprises: a film capacitor element that comprises a coiled body in which an insulating layer and an electrification layer are laminated and wound together, and a pair of collector electrodes that are formed upon two opposite end faces of the coiled body; a case that comprises a capacitor housing portion within which the film capacitor element is received; a pair of inserts having insulation properties, one of which is inserted between one of the pair of collector electrodes and one of inner walls of the capacitor housing portion; and a mass of sealing and insulating material that is charged between the film capacitor element and the one of the inner walls of the capacitor housing portion, wherein: the inner walls of the capacitor housing portion include a pair of mutually opposing inner walls, each of which confronts one of the pair of collector electrodes; each of the pair of inserts is inserted between one of the pair of mutually opposing inner walls and corresponding one of the pair of collector electrodes, and has an electrode side facing surface that confronts the corresponding one of the pair of collector electrodes and a case side facing surface that confronts the one of the pair of mutually opposing inner walls; on the electrode side facing surface, there are provided electrode side contact portions that contact the corresponding one of the pair of collector electrodes and electrode side isolated portions that are separated from the corresponding one of the pair of collector electrodes; on the case side facing surface, there are provided case side contact portions that contact the one of the pair of mutually opposing inner walls and case side isolated portions that are separated from the one of the pair of mutually opposing inner walls; and the sealing and insulating material is charged between the corresponding one of the pair of collector electrodes and the electrode side isolated portions, and between the one of the pair of opposing inner walls and the case side isolated portions.

According to the 2nd aspect of the present invention, an electrical power conversion device, comprises: a capacitor device according to the 1st aspect; a power semiconductor module that converts between DC electrical power and AC electrical power; and a plate shaped conductor plate where a circuit is formed that electrically connects between the power semiconductor module and the film capacitor element, wherein: the case is formed in a shape of a box having a bottom but no lid, and an aperture for receiving the film capacitor and the inserts is formed at an upper surface of the capacitor housing portion; the film capacitor element comprises capacitor terminals that electrically connect the collector electrodes and the conductor plate; the capacitor terminals project vertically from the aperture of the case; and the conductor plate is disposed parallel to the upper surface of the case.

BRIEF DESCRIPTION OF DRAWINGS

FIGS. 4A and 4B are figures schematically showing cross sections of this capacitor device;

FIGS. 6A and 6B are figures schematically showing cross sections of a capacitor device according to a second embodiment;

DESCRIPTION OF EMBODIMENTS

Embodiment #1

Figure 1:
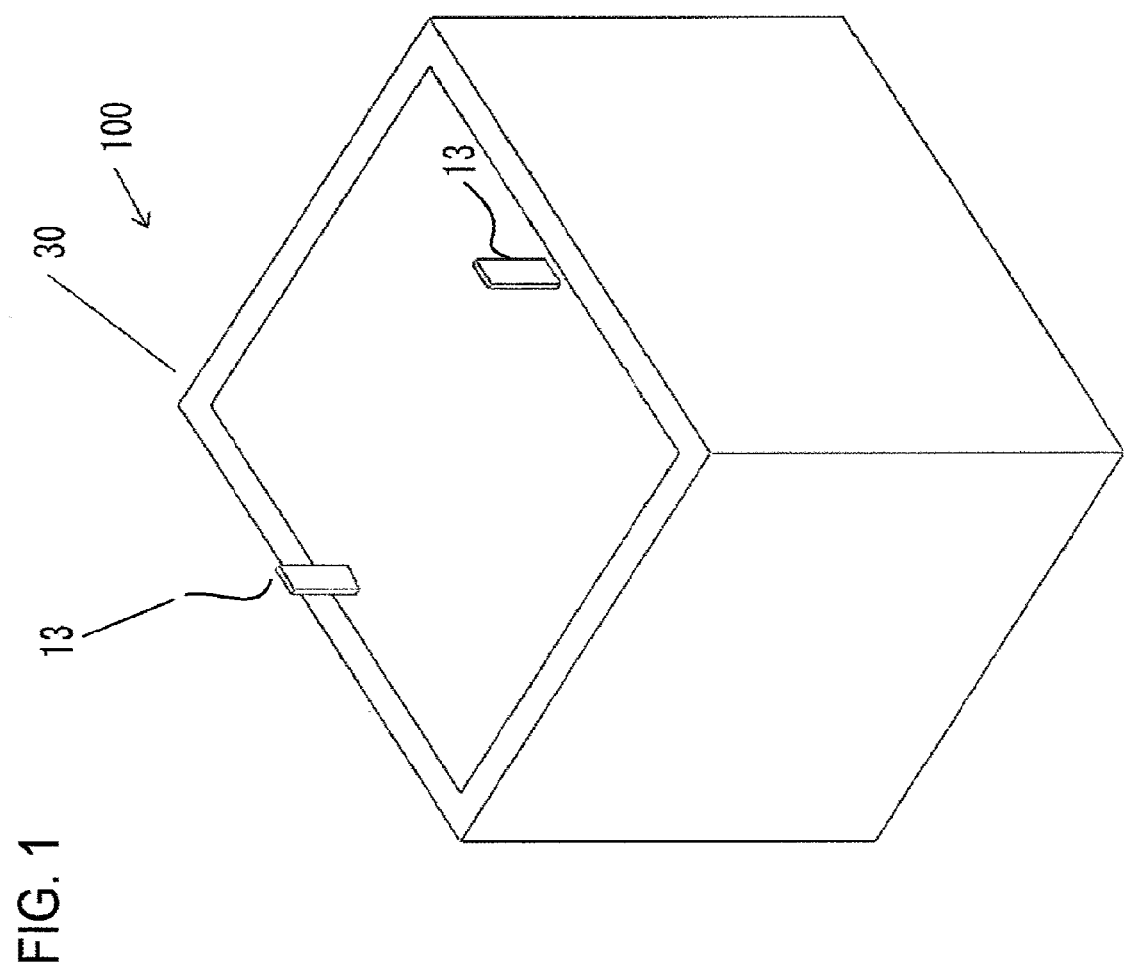
FIG. 1 is an external view of a capacitor device according to a first embodiment.
Figure 2:
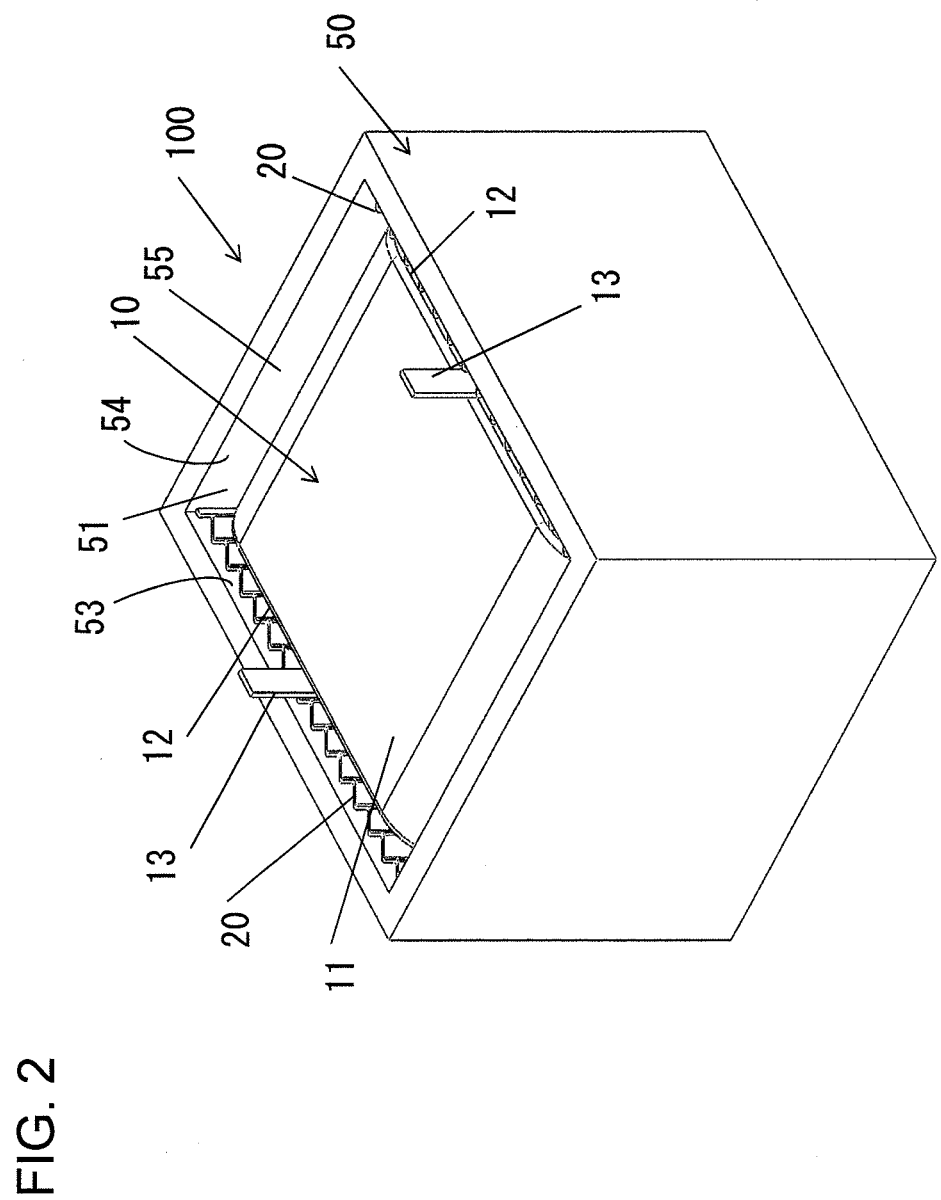
FIG. 2 is a figure showing the situation in the interior of this capacitor device.
Figure 3:
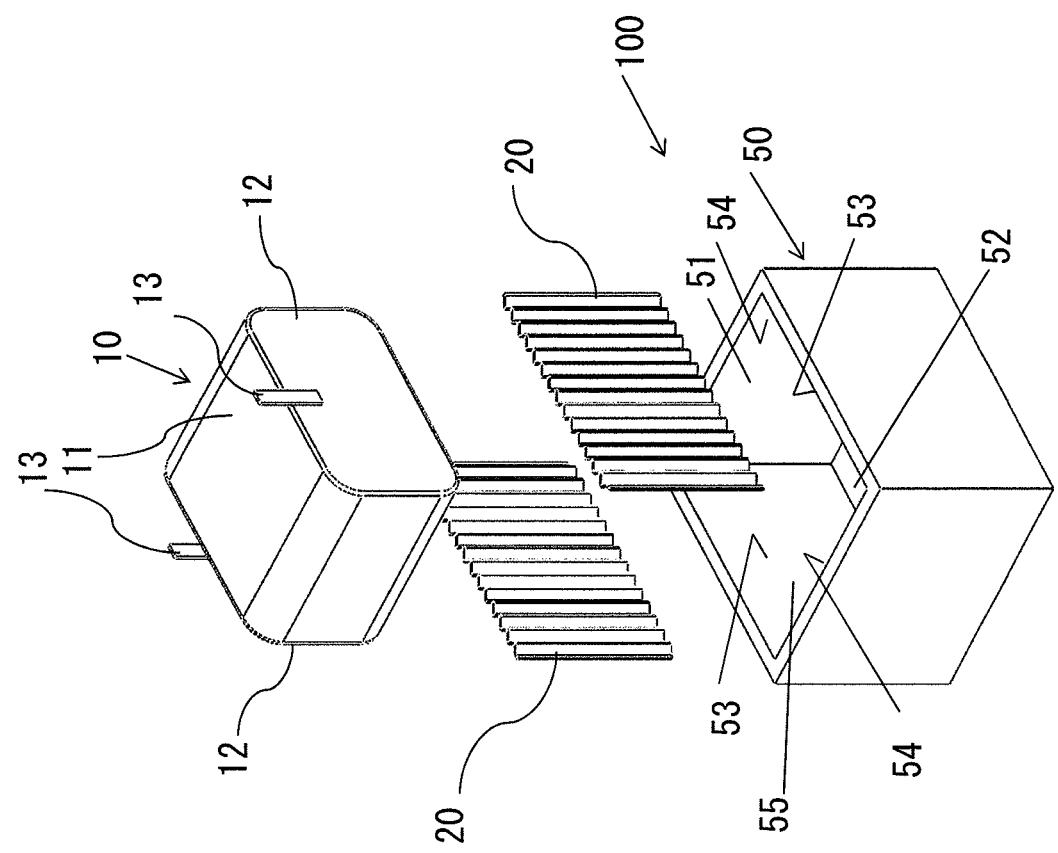
FIG. 3 is an exploded diagram showing this capacitor device.

First embodiments of a capacitor device and of an electrical power conversion device according to the present invention will now be explained with reference to FIGS. 1 through 5. FIG. 1 is an external view of the capacitor device 100 according to the first embodiment, and FIG. 2 is a figure showing the situation in the interior of this capacitor device 100. Moreover, FIG. 3 is an exploded diagram showing the capacitor device 100, and FIGS. 4A and 4B are figures schematically showing cross sections of the capacitor device 100. This capacitor device 100 is a component that is employed, for example, for smoothing DC power produced by an electrical power conversion device that is used in a HEV (hybrid electric vehicle) or an EV (electric vehicle) or the like. A capacitor like this is called a DC-link capacitor.

The capacitor device 100 comprises a film capacitor element 10, a case 50 made from metal that contains the film capacitor element 10, two resin sheets (inserts) 20 that are formed with projections, and a mass of sealing and insulating material 30. The film capacitor element 10 comprises a coiled body 11 including two films each made from an organic dielectric film with metal vapor deposited thereupon, laid or laminated over one another and coiled or wound together, and two collector electrodes (metallikon electrodes) 12, 12 that are formed on the two end faces of this coiled mass. A terminal 13 is connected to each of these collector electrodes 12, 12, and these terminals 13, 13 electrically connect together electrically conductive plates not shown in the figures in this embodiment and the collector electrodes 12, 12. In other words, the film capacitor 10 that is used in this embodiment is a single capacitor component in which the pair of terminals 13, 13 are attached to the film capacitor element 10. A metal layer vapor-deposited on the organic dielectric film is called an electrification layer.

The case 50 is a box-shaped storage vessel that has a bottom but no lid and is made from metal; it may, for example, be made by aluminum die casting. The space interior to the case 50 constitutes a capacitor housing portion 51. The case 50 comprises an aperture 55 at its upper side in the figure, two mutually opposing inner walls 53, 53, two other inner walls 54, 54 that are orthogonal to the opposing inner walls 53, 53, and a bottom surface 52 of the capacitor housing portion 51 (i.e. a housing bottom surface portion). As will be described hereinafter, the opposing inner walls 53, 53 are inner walls that face the collector electrodes 12, 12 of the film capacitor element 10 with the interposition of the inserts 20. As shown in FIG. 4A, a flow conduit (passage) 56 in which a cooling medium (coolant) flows is provided within the lower portion of the case 50, below the surface of the housing bottom surface portion 52.

Each of the inserts 20 is formed by being processed into a concave-convex or ribbed shape, and is a plate shaped member having the shape of a wavy plate, as shown for example in FIGS. 2, 3, and 4. As described above, each of the inserts 20 is inserted between one of the collector electrodes 12 of the film capacitor element 10 that is received in the capacitor housing portion 51, and a corresponding one of the opposing inner walls 53 of the capacitor housing portion 51. The inserts 20 are made from a material that is resilient and electrically insulating, such as resin or the like. In concrete terms, the material used for the inserts 20 may, for example, be PET, PPS, PP, PBT, PVC (polyvinyl chloride), PEN (polyethylene naphthalate), PC (polycarbonate), or the like.

The surface of each of the inserts 20 that faces its corresponding collector electrode 12 is termed its electrode side facing surface 21, and its surface that faces its corresponding opposing inner wall 53 is termed its case side facing surface 26 (refer to FIG. 4B). When the insert 20 is viewed from the side of its electrode side facing surface 21, its portions that correspond to hills on its wavy plate shape are termed electrode side contact portions 22, while its portions that correspond to valleys on its wavy plate shape are termed electrode side isolated portions 23. And, when the insert 20 is viewed from the side of its case side facing surface 26, its portions that correspond to hills on its wavy plate shape are termed case side contact portions 27, while its portions that correspond to valleys on its wavy plate shape are termed case side isolated portions 28. As shown in the sectional view of FIG. 4B indicated by the arrows X1-X2, in this embodiment, the summit portions of the hills of the wavy plate that constitute the electrode side contact portions 22 and the case side contact portions 27 are flattened. Moreover, when seen along the direction in which the collector electrode 12 and the insert 20 are laid together, the area of the insert 20 is broader than the area of the collector electrode 12.

The sealing and insulating material 30 is made from a resin material such as, for example, urethane, epoxy, PPS, silicone or the like, and desirably is made from a resin material into which is mixed an insulating high thermal conductivity filler, such as silicon carbide, aluminum nitride, boron nitride, silicon nitride, magnesia, alumina, crystalline silica, fused silica, or the like.

The capacitor device 100 made in this way is assembled as follows. First, the inserts 20, 20 are both placed against the opposing inner walls 53, 53 of the capacitor housing portion 51 of the case 50. At this time, the inserts 20 are disposed so that the direction along which the hill portions and the valley portions of their wavy plate shapes extend is parallel to the direction from the aperture 55 of the case 50 towards the housing bottom surface portion 52.

And then the film capacitor element 10 is inserted into the capacitor housing portion 51. At this time, each of the inserts 20 is compressed in its thickness directions by its corresponding collector electrode 12 between the corresponding collector electrode 12 and the corresponding opposing inner wall 53. Due to this, the restoring force of the insert 20 as it tries to return to its original thickness acts as a biasing force upon the collector electrode 12 and the opposing inner wall 53, in the direction to separate them. Accordingly, the film capacitor element 10 is temporarily held up and its position is temporarily fixed in a state in which the lower side of the film capacitor element 10 in FIGS. 3 and 4 is appropriately separated from the housing bottom surface portion 52. Thereafter the sealing and insulating material 30 is charged into all of the gaps between the capacitor housing portion 51 and the film capacitor element 10, and is then hardened. Due to this, the film capacitor element 10 is mechanically fixed to the case 50.

It should be understood that the sealing and insulating material 30 is charged both into the gaps between the collector electrodes 12 and the electrode side isolated portions 23, and also into the gaps between the opposing inner walls 53 and the case side isolated portions 28. Moreover, the sealing and insulating material 30 is also charged into the gap between the bottom surface of the film capacitor element 10 in FIGS. 3 and 4 and the housing bottom surface portion 52. Yet further, in order to protect the film capacitor element 10 against moisture and so on, the sealing and insulating material 30 is also charged into the portion above the film capacitor element 10 in FIGS. 3 and 4 (refer to FIGS. 1, 4A and 4B).

Figure 5A:
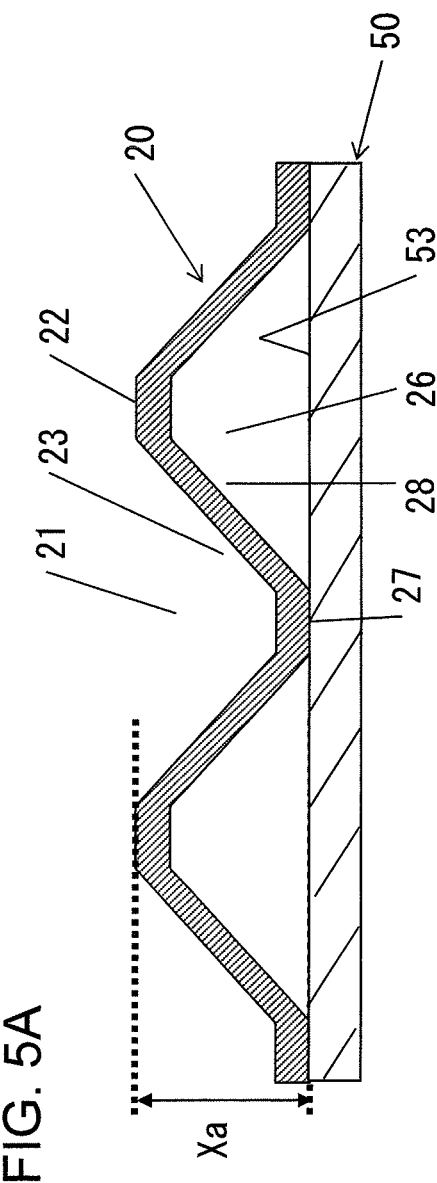
FIGS. 5A and 5B are figures for explanation of change of the dimensions of an insert, before and after a film capacitor element has been inserted.
Figure 5B:
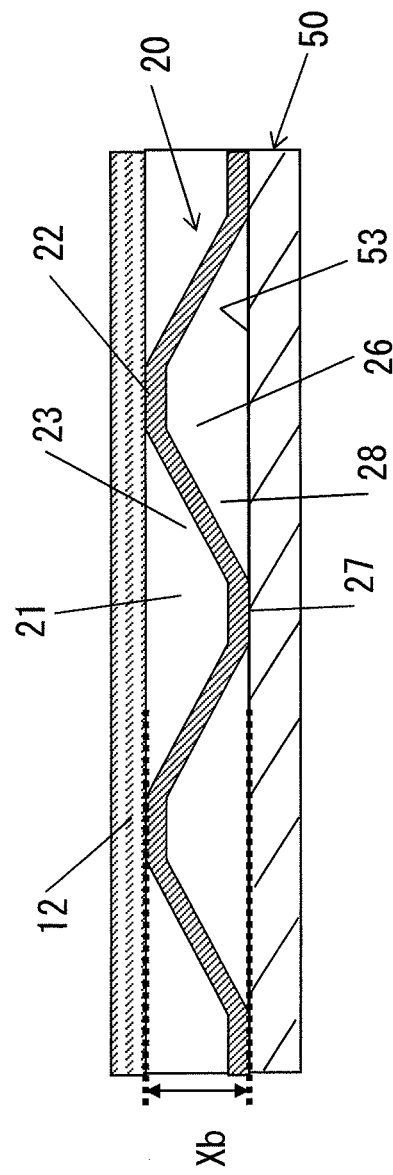

The way in which the dimensions of the insert 20 are changed by the film capacitor element 10 being inserted into the capacitor housing portion 51 will now be explained with reference to FIGS. 5A and 5B. The thickness of the insert 20 before the film capacitor element 10 is inserted, in other words the distance between the electrode side contact portions 22 and the case side contact portions 27 along the direction orthogonal to the opposing inner wall 53 when the insert 20 is disposed against that opposing inner wall 53, is shown as Xa. On the other hand, the thickness of the insert 20 after the film capacitor element 10 has been inserted is shown as Xb.

The magnitude relationship of the thicknesses Xa, Xb of the inserts 20 is that Xb<Xa. In other words, when the film capacitor element 10 is inserted into the capacitor housing portion 51, the thickness of each of the inserts 20 changes from Xa to Xb, due to the insert 20 being compressed between its corresponding collector electrode 12 and its corresponding opposing inner wall 53 and being warped or contracted thereby.

The capacitor device 100 having the above structure is able to provide the following beneficial operational effects.

(1) It is arranged for the inserts 20, that function as insulators, to be inserted between the collector electrodes 12 of the film capacitor element 10 that is housed in the capacitor housing portion 51 and the corresponding opposing inner walls 53. Since, due to this, it is possible to ensure good electrical insulation between the collector electrodes 12 and the opposing inner walls 53, accordingly it is possible to house the film capacitor element 10, whose collector electrodes 12 are exposed, within the case 50 that is made from metal. Accordingly, it is made possible for the film capacitor element 10, that is a component to which only the pair of terminals 13 are attached, to be directly used in the capacitor housing portion 51. Due to this, it is possible to anticipate enhancement of the speed of development of the capacitor device 100, and reduction of its cost. Moreover, it is not necessary to provide any external insulating film or the like upon the film capacitor element 10, so that it is possible to save the cost that would be entailed by such external insulating film.

Furthermore, by shaping the inserts 20 so that they have concave-convex shapes due to the hills and valleys upon their wavy plate shapes, it is possible to increase the surface area of the adhered layers where the sealing and insulating material 30 is charged between the electrode side facing surfaces 21 of the inserts 20 and the collector electrodes 12, and also to increase the surface area of the adhered layers between the case side facing surfaces of the inserts 20 and the opposing inner walls 53, so that it is possible to improve the strength of adhesion of these layers.

(2) The inserts 20 are members that are endowed with resilience, and accordingly it is ensured, when the film capacitor element 10 is inserted into the capacitor housing portion 51, that each of the collector electrodes 12 will be biased by the biasing force of its corresponding insert 20 in the direction away from its corresponding inner wall 53. Due to this, the film capacitor element 10 is positioned at the center between the opposing inner walls 53, 53 while absorbing any manufacturing errors due to the processing tolerance for the case 50 (i.e. errors in the distance between the two opposing inner walls 53, 53).

Accordingly, it becomes unnecessary to provide any free space as a precaution against errors in the distance between the two mutually opposing inner walls 53, so that it is possible to make the distance between the collector electrodes 12 and the corresponding inner walls 53 as small as possible while still preserving the necessary insulation characteristics. In other words, it is possible to reduce the thickness of the sealing and insulating material 30 between each of the collector electrodes 12 and its opposing inner wall 53, so that it is possible to reduce the thermal resistance of this layer. Due to this, it becomes easier for heat generated by the film capacitor element 10 to reach the metallic case 50 that is built so as to be cooled by the cooling medium, so that the durability of this capacitor device 100 is enhanced, since the performance for cooling the film capacitor element 10 is enhanced.

(3) The areas of the inserts 20 are made to be greater than the areas of the collector electrodes 12, when seen along the direction in which the collector electrodes 12 and the inserts 20 are mutually overlaid over one another. Due to this, it is possible to ensure good electrical insulation between the collector electrodes 12 and their corresponding opposing inner walls 53, and thus it is possible to enhance the reliability of this capacitor device 100.

(4) It is arranged, when the film capacitor element 10 is inserted into the capacitor housing portion 51, for the collector electrodes 12, 12 to compress the inserts 20, between themselves and the opposing inner walls 53, 53, i.e. in the thickness direction of the inserts 20, 20. Since, due to this, the restoring force created by the inserts trying to return to their original thickness operates as a biasing force upon the collector electrodes 12, 12 and the opposing inner walls 53, 53 in the direction to separate them, accordingly the film capacitor element 10 is temporarily fixed in its position in the state in which the bottom surface in FIGS. 3 and 4 of the film capacitor element 10 is kept temporarily held at an appropriate separation from the housing bottom surface portion 52. Since the sealing and insulating material 30 is then charged into the gap between the bottom surface in FIGS. 3 and 4 of the film capacitor element 10 and the housing bottom surface portion 52, accordingly the strength with which the film capacitor element 10 is fixed is increased. Thus, it is possible to enhance the durability of this capacitor device 100, and it is also possible to enhance the reliability of the film capacitor device 100.

Embodiment #2

Figure 7:
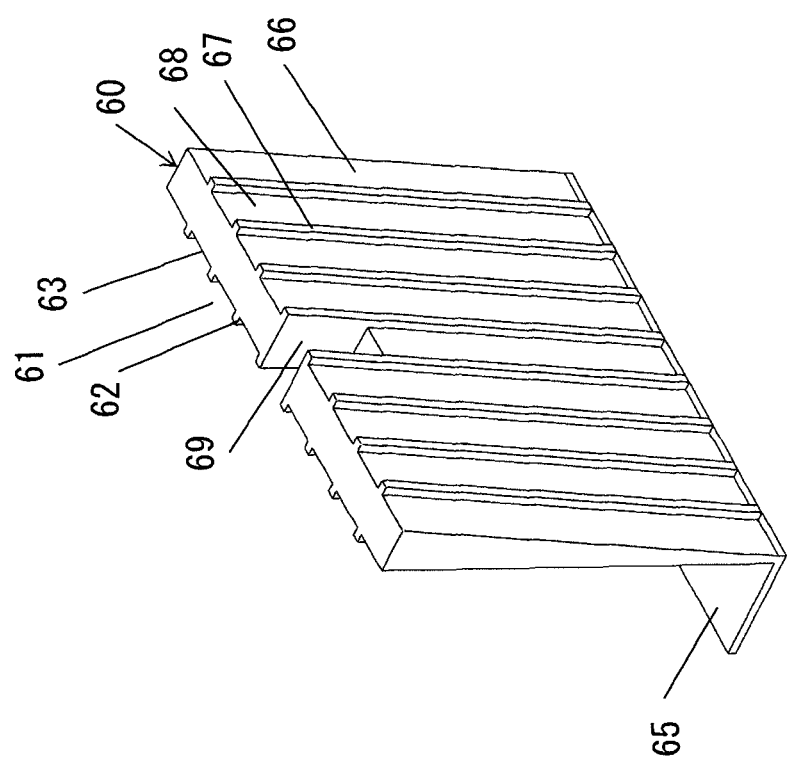
FIG. 7 is a perspective view of an insert of this second embodiment.

Referring to FIGS. 6A, 6B and 7, a capacitor device and an electrical power conversion device according to a second embodiment of the present invention will now be explained. In the following explanation, to structural elements that are the same as in the first embodiment, the same reference symbols are appended, and the explanation will principally focus upon the points of difference. Features that are not particularly explained are the same as in the first embodiment. In this embodiment, principally, the aspect that is different from the first embodiment is the feature that, instead of performing positional determination of the film capacitor element 10 by taking advantage of the resilience of the inserts 20, positional determination of the film capacitor element 10 is performed by forming opposing inner walls 57, 57 as inclined, and by also forming the inserts 60 in the shape of tapers or wedges, so that they are engaged with each other.

FIGS. 6A and 6B are figures schematically showing cross sections of a capacitor device 100 according to this second embodiment, and FIG. 7 is a perspective view of one of the inserts 60. In the case 50 of this embodiment, the opposing inner walls 57, 57 that confront the collector electrodes 12, 12 of the film capacitor element 10 via the inserts 60 are inclined inwards in a tapered configuration, so that the space between them becomes narrower down from the aperture 55 to the housing bottom surface portion 52.

And, as shown in FIG. 7, each of the inserts 60 is a taper or wedge shaped plate member that becomes thinner in the downward direction in the figures, and its surfaces are processed so as to be concave-convex. The lower edge of the insert 60 in the figure is angled around at approximately a right angle towards the film capacitor element 10 within the capacitor housing portion 51, so that the insert 60 generally has the form of a letter-L. This portion is termed the "capacitor support portion 65". Moreover, a cutaway portion 69 is provided in the insert 60 for accommodating and avoiding the corresponding terminal 13.

The surface of the insert 60 that faces the collector electrode 12 is termed the "electrode side facing surface 61", while its side that faces the opposing inner wall 53 is termed the "case side facing surface 66". Electrode side contact portions 62 and case side contact portions 67 are provided upon the electrode side facing surface 61 and upon the case side facing surface 66 respectively, and are formed as projecting ribs that extend in the vertical direction in the figure. And the portions on the electrode side facing surface 61 that are stepped downward from the electrode side contact portions 62 are termed "electrode side isolated portions 63". Moreover, the portions on the case side facing surface 66 that are stepped downward from are the case side contact portions 67 are termed "case side isolated portions 68".

On the inserts 60, the electrode side facing surfaces 61 and the lower end capacitor support portions 65 are approximately orthogonal. Moreover, as shown in FIGS. 6A and 6B, in the state in which the inserts 60 are inserted into the capacitor housing portion 51 along with the film capacitor element 10, their electrode side contact portions 62 on their electrode side facing surfaces 61 are contacted against the corresponding collector electrodes 12, while their case side contact portions 67 on their case side facing surfaces 66 are contacted against the corresponding opposing inner walls 53.

The inserts 60 are made from a resin material such as, for example, urethane, epoxy, PPS, silicone or the like, and desirably are made from a resin material into which is mixed an insulating high thermal conductivity filler, such as silicon carbide, aluminum nitride, boron nitride, silicon nitride, magnesia, alumina, crystalline silica, fused silica, or the like; and desirably they are made from a resin type material whose thermal conductivity is 1.0 W/mK or greater. The method for manufacturing the inserts 60 is not particularly limited; for example, they may be made by injection molding.

It should be understood that since, in this embodiment, as will be described hereinafter, the film capacitor element 10 is positionally determined and is fixed in place by the inserts 60, that are shaped as tapers, being slid along the opposing inner walls 57 that are also shaped as being appropriately inclined in a tapered configuration, accordingly the inserts 60 do not need to be resilient, as was the case for the inserts 20 of the first embodiment. Thus it is possible to employ a material that has high thermal conductivity for the inserts 60, in view of the desirability of enhancing the cooling performance for the film capacitor element 10. In other words, it is desirable to make the thermal conductivity of the inserts 60 to be higher than the thermal conductivity of the sealing and insulating material 30.

The capacitor device 100 having this structure is assembled in the following manner. The inserts 60 are both installed at the two ends of the film capacitor element 10, that is placed in an attitude with the ends of the terminals 13, 13 pointing upwards. In this state, the film capacitor element 10 and the inserts 60 are inserted into the capacitor housing portion 51. In other words, the film capacitor element 10 and the inserts 60 are inserted into the capacitor housing portion 51 in their state with the collector electrodes 12 and the electrode side contact portions 62 of the electrode side facing surfaces 61 in contact.

At this stage the state shown in FIG. 6A has been reached, except for the sealing and insulating material 30 that is not yet present. In other words, two of the lower edges of the film capacitor element 10 are supported by the capacitor support portions 65 of the inserts 60, so that the film capacitor element 10 is temporarily held and fixed in the state of being appropriately separated from the storage unit bottom surface 52. Moreover, when the film capacitor element 10 and the inserts 60 are shifted downward due to their own weights, the inserts 60 that are shaped as tapers shift downwards along the opposing inner walls 57 that are inclined so as to define a tapered configuration. Since, due to this, the electrode side contact portions 62 of the electrode side facing surfaces 61 press the collector electrodes 12 towards the center of the film capacitor element, accordingly the film capacitor element 10 is shifted and positionally determined to the center of the capacitor housing portion 51 in the horizontal direction in the figure. Moreover, the case side contact portions 67 of the inserts 60 are contacted against the corresponding opposing inner walls 57.

Thereafter, the sealing and insulating material 30 is charged into the gap between the capacitor housing portion 51 and the film capacitor element 10, and solidifies. Due to this, the film capacitor element 10 becomes mechanically fixed to the case 50. It should be understood that the sealing and insulating material 30 is also charged into the gaps between the collector electrodes 12 and the electrode side isolated portions 63, and into the gaps between the opposing inner walls 57 and the case side isolated portions 68. Moreover, the sealing and insulating material 30 is also charged into the gap between the lower surface as seen in the figure of the film capacitor element 10 and the housing bottom surface portion 52. Yet further, the sealing and insulating material 30 is also charged above the upper portion as seen in the figure of the film capacitor element 10, in order to protect the film capacitor element 10 from moisture and the like (refer to FIG. 6A).

With the capacitor device 100 according to this second embodiment, in addition to the beneficial operational effects provided by the first embodiment, the following beneficial operational effects are also provided.

(1) The film capacitor element 10 is positionally determined and is fixed as a result of this structure, in which the inserts 60 that are formed in taper or wedge shapes shift along the opposing inner walls 57 that are inclined so as to define a tapered configuration. Due to this, the film capacitor element 10 is centered between the opposing inner walls 57, 57 and is positionally determined, with any processing tolerances of the case 50 (in other words, errors in the distance apart of the opposing inner walls 57, 57) being absorbed.

Accordingly, it is not necessary to provide any extra space in consideration of errors in the distance apart of the opposing inner walls 57, 57 as manufactured, so that it is possible to reduce the distances between the collector electrodes 12 and the opposing inner walls 57. Due to this, it becomes easier for heat that is generated in the film capacitor element 10 to be transmitted to the case 50 that is built so as to be cooled with the cooling medium, and thereby the durability of this capacitor device 100 is enhanced, since the cooling performance for the film capacitor element 10 is improved.

Moreover, since no elastic force is required to be provided by the inserts 60 during positional determination of the film capacitor element 10, accordingly it is possible to give priority to thermal conductivity when selecting the material to be used for the inserts 60. In other words, since it is no longer necessary to select a material that sacrifices thermal conductivity in order to acquire resilience, accordingly it is possible to enhance the cooling performance for the film capacitor element 10, so that the durability of the capacitor device 100 can be enhanced.

Furthermore, since it is possible to employ inserts 60 that are manufactured in advance and that are not required to be resilient, accordingly it is also not necessary to give any consideration to fluidity for flowing within the capacitor housing portion 51, as is necessary in the case of selection of the sealing and insulating material 30. Accordingly, when selecting the material to be used for the inserts 60, no priority need be given to its fluidity during manufacture of the capacitor device 100, and priority can be given to thermal conductivity. Due to this aspect as well, it is possible to enhance the performance for cooling the film capacitor element 10, so that it is possible to enhance the durability of the capacitor device 100.

(2) The structure is such that the electrode side contact portions 62 of the inserts 60 contact against the corresponding collector electrodes 12, while their case side contact portions 67 contact against the corresponding opposing inner walls 57. Moreover, at the electrode side isolated portions 63 and the case side isolated portions 68, these are contacted against the corresponding collector electrodes 12 and opposing inner walls 57 respectively via the sealing and insulating material 30, whose thickness in those locations corresponds to the heights of the electrode side contact portions 62 and of the case side contact portions 67. Accordingly, since the material that is used for the inserts 60 has higher thermal conductivity than the sealing and insulating material 30, it is possible to enhance the performance for cooling the film capacitor element 10, so that it is possible to enhance the durability of the capacitor device 100.

(3) In this structure, the electrode side contact portions 62 and the case side contact portions 67 are provided upon the electrode side facing surfaces 61 and the case side facing surfaces 66. Since, due to this, it is possible to charge the sealing and insulating material 30 into the electrode side isolated portions 63 that are stepped down from the electrode side contact portions 62, and into the case side isolated portions 68 that are stepped down from the case side contact portions 67, accordingly it is possible to fix the film capacitor element 10 to the case 50 with sufficient strength. Accordingly, it is possible to enhance the durability of the capacitor device 100, so that it is possible to enhance the reliability of the capacitor device 100.

(4) In this structure, the lower edges of the film capacitor element 10 are supported upon the capacitor support portions 65, so that the film capacitor element 10 is temporarily held and fixed in the state of being held above and away from the storage unit bottom surface 52. Since, due to this, it is also possible to charge the sealing and insulating material 30 into the gap that is defined between the lower side of the film capacitor element 10 and the housing bottom surface portion 52, accordingly it is possible to increase the strength of fixing of the film capacitor element 10. Accordingly, it is possible to enhance the durability of the capacitor device 100, so that it is possible to enhance the reliability of the capacitor device 100.

Embodiment #3

Referring to FIGS. 8 through 12, a capacitor device and an electrical power conversion device according to a third embodiment of the present invention will now be explained. In the following explanation, to structural elements that are the same as in the first and second embodiments, the same reference symbols are appended, and the explanation will principally focus upon the points of difference. Features that are not particularly explained are the same as in the first and second embodiments. In this embodiment, principally, the aspect that is different from the first and the second embodiments is the feature that a film capacitor element and a power semiconductor module are received within the same case and function together as an electrical power conversion device.

The electrical power conversion device of this embodiment is not limited to application in a hybrid automobile (i.e. an HEV); it can also be applied as an electrical power conversion device to be mounted in a vehicle such as a plug-in hybrid automobile (i.e. a PHEV) or an electric automobile (i.e. an EV) or the like; and moreover it can be applied as an electrical power conversion device for use in a vehicle such as a construction machine or the like.

Figure 8:
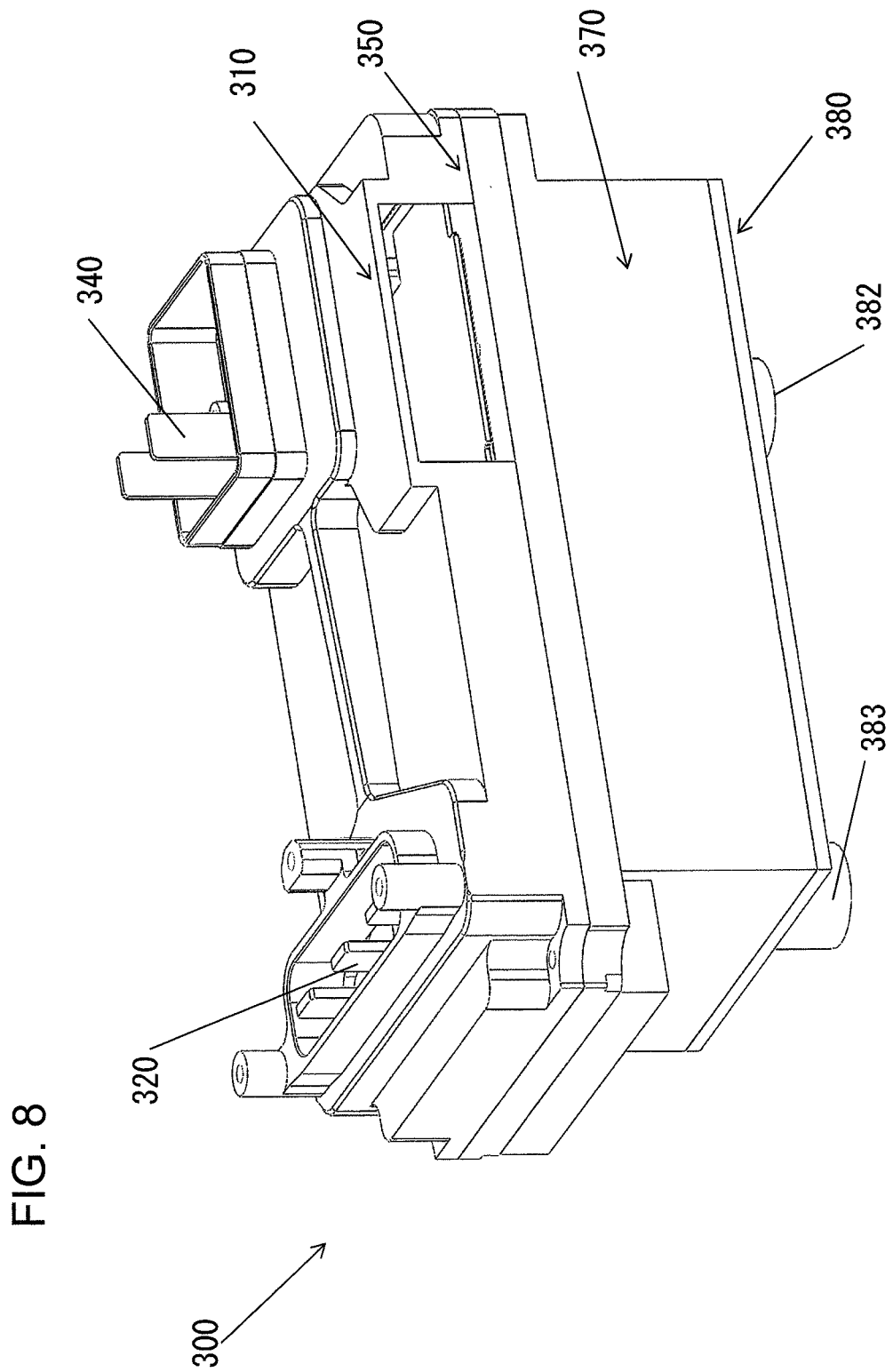
FIG. 8 is a perspective view showing the external appearance of an electrical power conversion device (that is an inverter device) according to a third embodiment.
Figure 9:
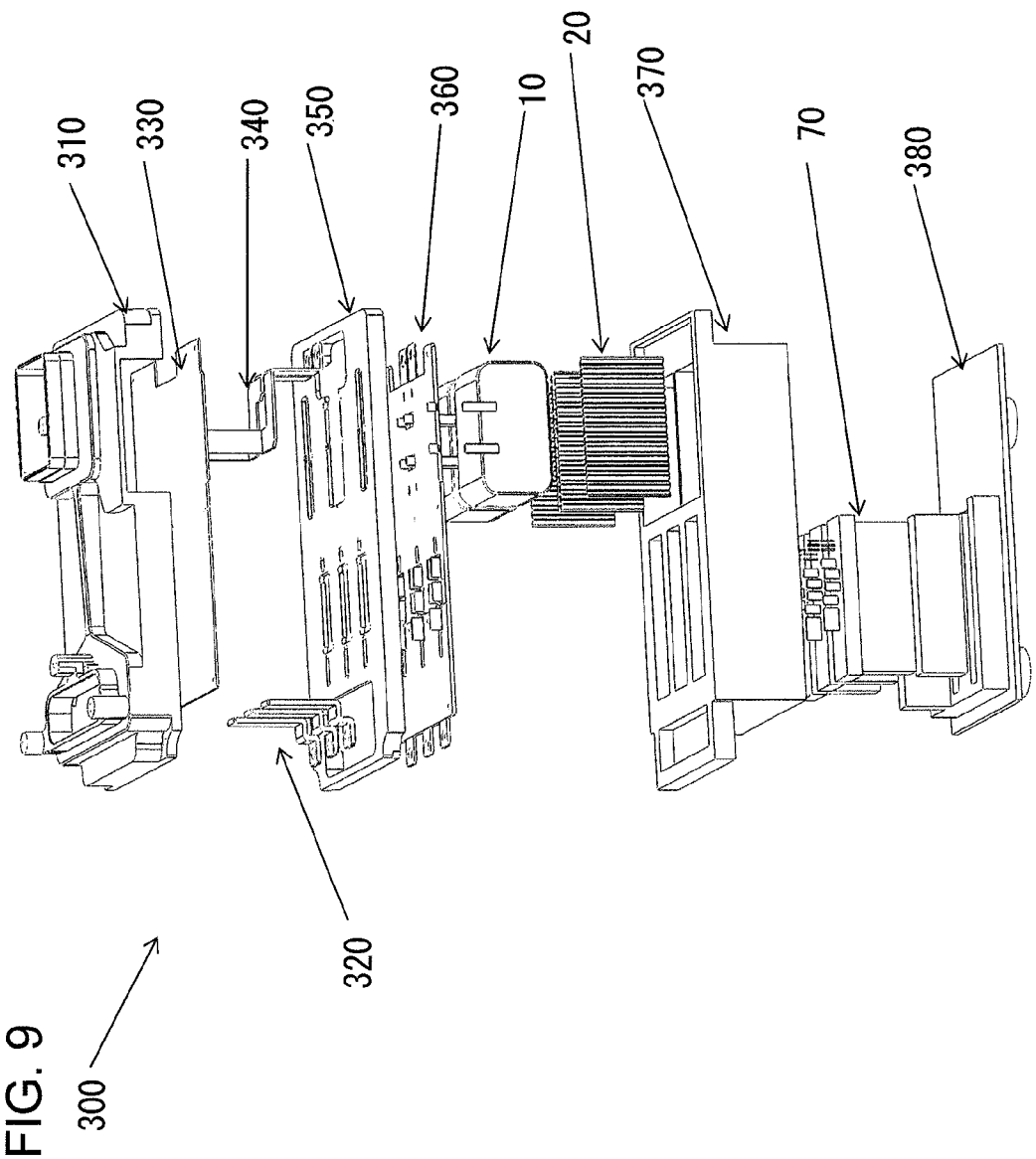
FIG. 9 is an exploded view of this inverter device.

FIG. 8 is a perspective view showing the external appearance of an electrical power conversion device 300 (that is an inverter device) according to this third embodiment, and FIG. 9 is an exploded view of this inverter device 300. The inverter device 300 comprises a top cover 310, AC connection terminals 320, a control board 330, DC connection terminals 340, an intermediate cover 350, and a conductor plate 360. Moreover, the inverter device 300 comprises a film capacitor element 10, a case 370, a power semiconductor module 70, and a lower cover 380.

In this inverter device 300, various components that make up the inverter device 300 are housed within the inverter case that includes the top cover 310, the intermediate cover 350, the case 370, and the lower cover 380. The case 370 is a case that houses a film capacitor element 10 and a power semiconductor module 70, as will be described hereinafter. The top cover 310 constitutes a lid for the intermediate cover 350, and the intermediate cover 350 constitutes a lid for the case 370. And the lower cover 380 is a bottom lid for the case 370. The lower cover 380 and the case 370 constitute a flow conduit 56, in which a cooling medium (for example, water) flows for indirectly cooling the film capacitor element 10, and for directly cooling the power semiconductor module 70. An inlet 382 and an outlet 383 for the cooling medium are provided in the lower cover 380. The top cover 310, the intermediate cover 350, the case 370, and the lower cover 380 may, for example, be made as aluminum castings.

The power semiconductor module 70 is a module that internally houses a series circuit of upper and lower arms of an inverter circuit that are built from power semiconductor elements, and is provided for supplying three phase AC electrical power having a U phase, a V phase, and a W phase. The conductor plate 360 is a laminate bus bar comprising a positive electrode conductor plate and a negative electrode conductor plate (neither of which is particularly shown) that are laminated together via an insulating member in sheet form (made from insulating paper or resin). It should be understood that the positive electrode conductor plate and the negative electrode conductor plate are made as wide plate shaped conductors. It is possible to reduce the resistance value and the inductance value of the conductor plate 360 by making a laminated construction in this manner from the positive electrode conductor plate and negative electrode conductor plate whose areas are large.

The intermediate cover 350 is a plate shaped member and is sandwiched between the case 370 and the top cover 310, and the role of conducting away the heat generated by the control board 330 to the cooling medium is fulfilled via the case 370. The DC connection terminals are terminals that are connected to the conductor plate 360, and that, externally, are connected to a secondary battery not shown in the figures. And the AC connection terminals 320 are terminals that are connected to AC terminals of the power semiconductor module 70, and that, externally, are connected to a motor-generator not shown in the figures.

The control board 330 is a board that carries control circuitry and driver circuitry of the inverter device 300. It should be understood that the control circuitry calculates whether or not the motor-generator not shown in the figures should operate as a motor or as a generator, generates control pulses on the basis of the result of this calculation, and supplies these control pulses to the driver circuitry. Moreover, the driver circuitry generates drive pulses for controlling the inverter circuit on the basis of these control pulses that are supplied.

Figure 10:
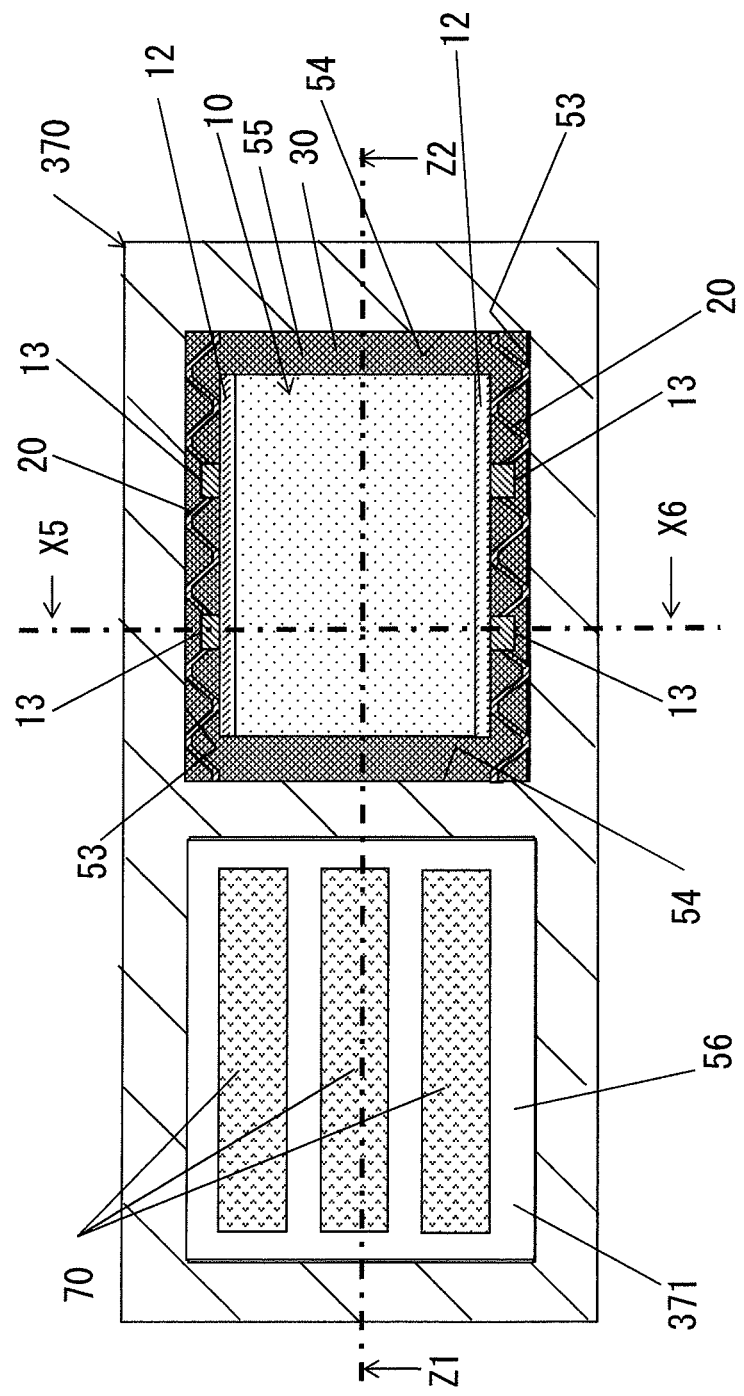
FIG. 10 is a figure for this third embodiment, schematically showing a cross section of a case in which a film capacitor element and a power semiconductor module are received, taken in a sectional plane that is parallel to a conductor plate.
Figure 11:
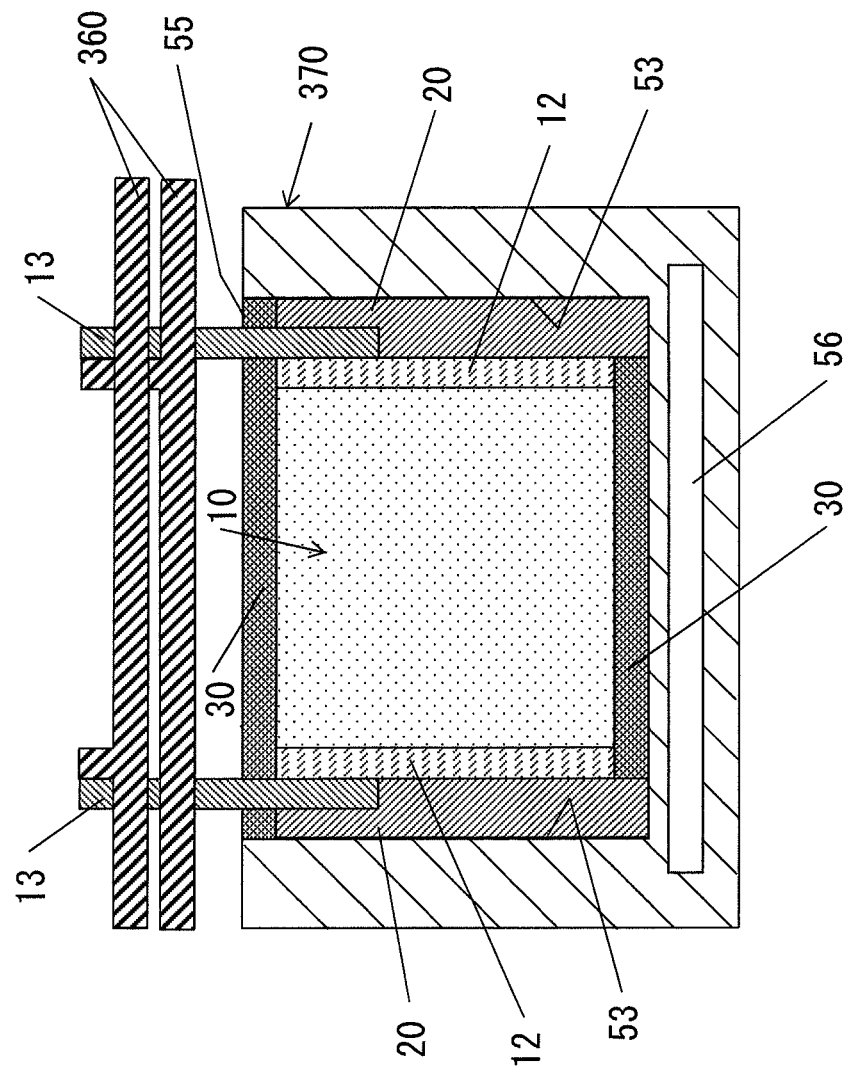
FIG. 11 is a sectional view of FIG. 10 taken in a sectional plane shown by the arrows X5-X6.
Figure 12:
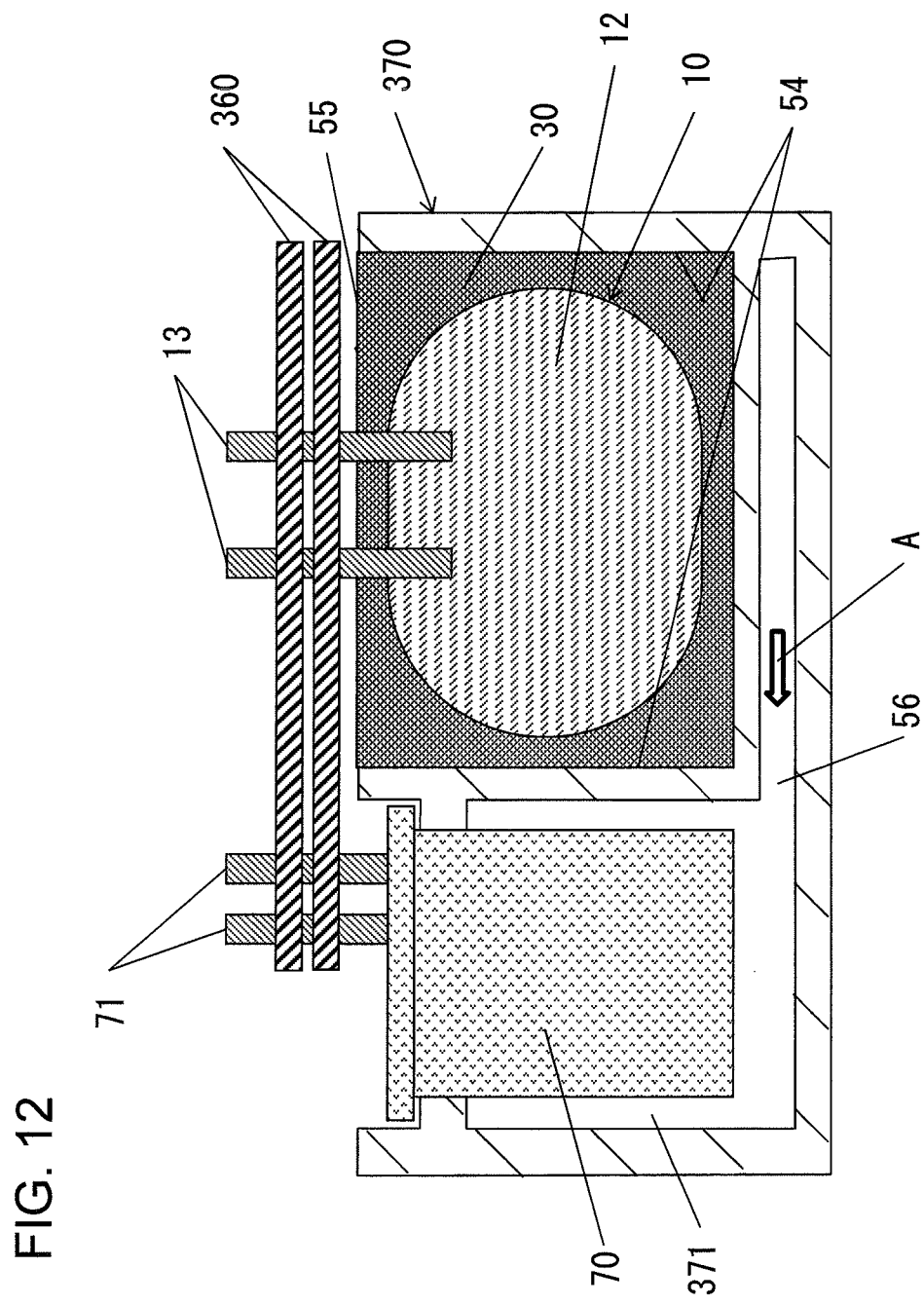
FIG. 12 is a sectional view of FIG. 10 taken in a sectional plane shown by the arrows Z1-Z2.

FIG. 10 is a figure for this third embodiment, schematically showing a cross section of the case 370 in which the film capacitor element 10 and the power semiconductor module 70 are received, taken in a sectional plane that is parallel to the conductor plate 360. And FIG. 11 is a sectional view of FIG. 10 taken in a sectional plane shown by the arrows X5-X6, while FIG. 12 is a sectional view of FIG. 10 taken in a sectional plane shown by the arrows Z1-Z2. In this embodiment, in the interior of the case 370, a power semiconductor module housing portion 371 and a capacitor housing portion 51 similar to the structure in the first embodiment are provided. The case 370 has an upper aperture 55, a pair of opposing inner walls 53, 53, a pair of inner walls 54, 54 that are orthogonal to the opposing inner walls 53, 53, and a housing bottom surface portion 52.

In the inverter device 300 of this embodiment, the position determination and temporary holding and fixing of the film capacitor element 10 with respect to the capacitor housing portion 51 by using the inserts 20, and the fixing of the film capacitor element 10 in the case 370 by charging and hardening the sealing and insulating material 30, are the same as in the first embodiment.

It should be understood that, with this inverter device 300, the power semiconductor module 70 is received within the case 370 adjacent to the capacitor housing portion 51, in other words somewhat away from the inner walls 54. As shown in FIG. 12, the flow conduit 56 that is provided below the capacitor housing portion 51 extends as far as the power semiconductor module housing portion 371. The arrow sign A within the flow conduit 56 shows the direction in which the cooling medium flows. In this manner, in this inverter device 300, the film capacitor element 10 is indirectly cooled by the cooling medium, whereas the power semiconductor module 70 is directly cooled thereby.

As shown in FIGS. 11 and 12, terminals 13 that are connected to the collector electrodes 12 of the film capacitor element 10 are projected vertically above the inverter device 300 from the aperture 55. These terminals 13 are electrically connected to the conductor plate 360, that is disposed above the case 370 and parallel to the upper surface of the case 370. By bringing the collector electrodes 12 close to the conductor plate 360 in this manner, it is possible to make the lengths of the terminals 13 as short as possible, so that it is possible to reduce the parasitic inductance.

Moreover, as shown in FIG. 12, the terminals 71 of the power semiconductor module 70 are electrically connected to the conductor plate 360.

With the capacitor device 300 according to this third embodiment, in addition to the beneficial operational effects provided by the first and second embodiments, the following beneficial operational effects are also provided.

(1) In this structure, it is arranged for the pair of terminals 13 to project through the shortest possible distance from the collector electrodes 12 to above the case 370. And it is arranged for the terminals 13 to be connected through the shortest possible distance to the conductor plate 360, that is disposed parallel to the upper surface of the case 370. Due to this, it is possible to reduce the inductance by shortening the length of the wiring, and accordingly it is possible to reduce the losses and to utilize the film capacitor element 10 in an efficient manner.

(2) As shown in FIG. 10, the collector electrodes 12 at the two sides of the film capacitor element 10 are arranged so as to confront the opposing inner walls 53 of the case 370. When, as in this embodiment, the power semiconductor module 70 and the film capacitor element 10 are housed within the same case 370, then, due to the generation of heat that accompanies losses in the power semiconductor module 70, the temperature of the cooling medium flowing in the flow conduit 56 in the neighborhood of the power semiconductor module 70 is elevated, and along therewith heat is transmitted to the film capacitor element 10 via the case 370. In the following, this heat that is transmitted to the case 370 and that exerts an influence upon the film capacitor element 10 will be termed "transmitted heat".

Due to this transmitted heat, among the four walls of the case 370, i.e. the pair of opposing inner walls 53 and the other pair of inner walls 54, the one of the opposing inner walls 53 that is adjacent to the power semiconductor module 70 can easily reach a high temperature, as compared to the other one of the opposing inner walls 53 and to the pair of inner walls 54. Thus, in order to optimize the cooling performance for the film capacitor element 10, in this embodiment, it is arranged for the inner wall that is adjacent to the power semiconductor module 70 to be made to be one of the inner walls 54 as described above, and for the opposing inner walls 53 to be made to be orthogonal to that inner wall 54. With this structure, it is possible to reduce the influence of the transmitted heat from the power semiconductor module 70, and to enhance the performance for cooling the film capacitor element 10. And accordingly the durability of the film capacitor element 10 is enhanced, so that the reliability of the inverter device 300 is improved.

(3) It is arranged for the flow conduit 56 that is provided below the capacitor housing portion 51 to extend as far as the power semiconductor module housing portion 371, so that the film capacitor element 10 is indirectly cooled by the cooling medium, while the power semiconductor module 70 is directly cooled thereby. And it is arranged for the cooling medium to flow from below the capacitor housing portion 51 toward the power semiconductor module housing portion 371. Due to this, it is possible to commonly use the flow conduit 56 that cools the power semiconductor module 70 and the film capacitor element 10, and thus to make the inverter device 300 more compact. Furthermore since, as compared to the power semiconductor module 70, it is possible to cool the film capacitor element 10 preferentially so that its temperature conditions become excellent, accordingly the durability of the film semiconductor element 10 is enhanced, so that the reliability of the inverter device 300 is improved.

Embodiment #4

Figure 13:
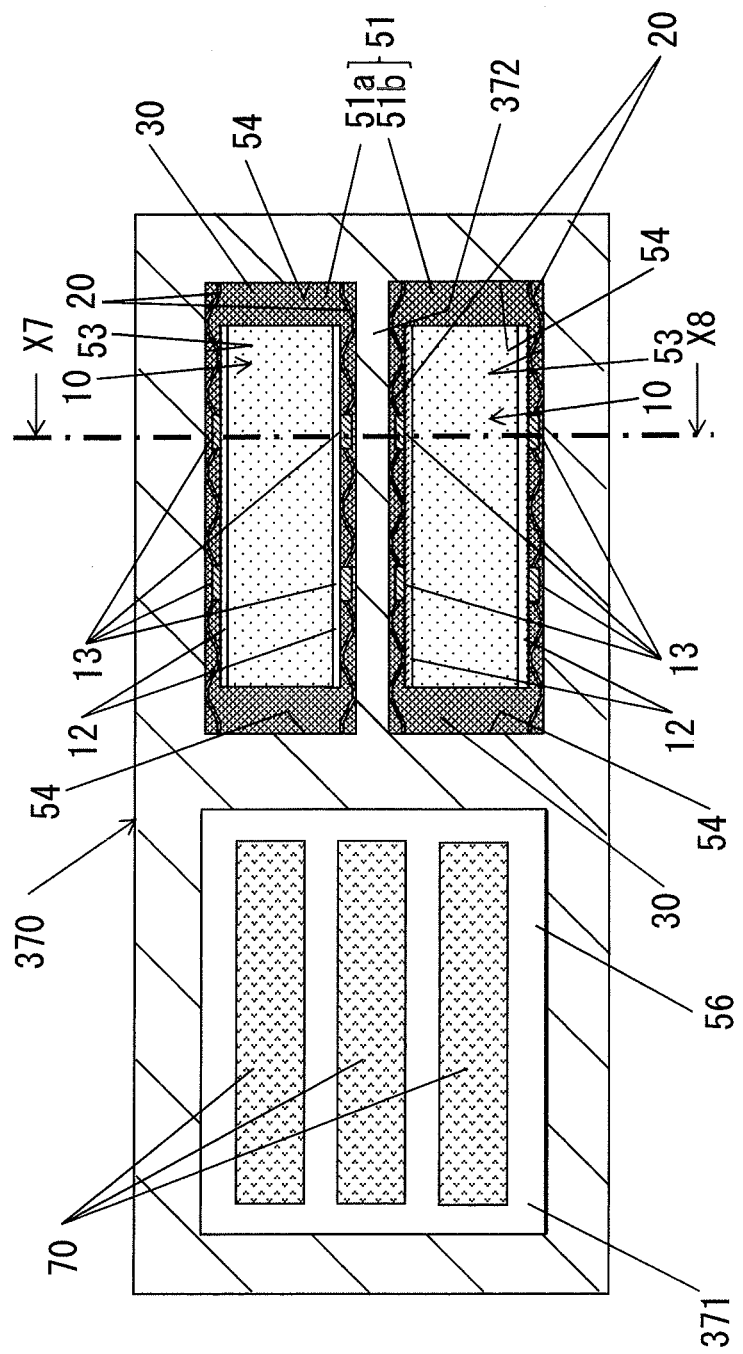
FIG. 13 is a figure for a fourth embodiment, schematically showing a cross section of a case in which several film capacitor elements and several power semiconductor modules are received, taken in a sectional plane that is parallel to a conductor plate.
Figure 14:
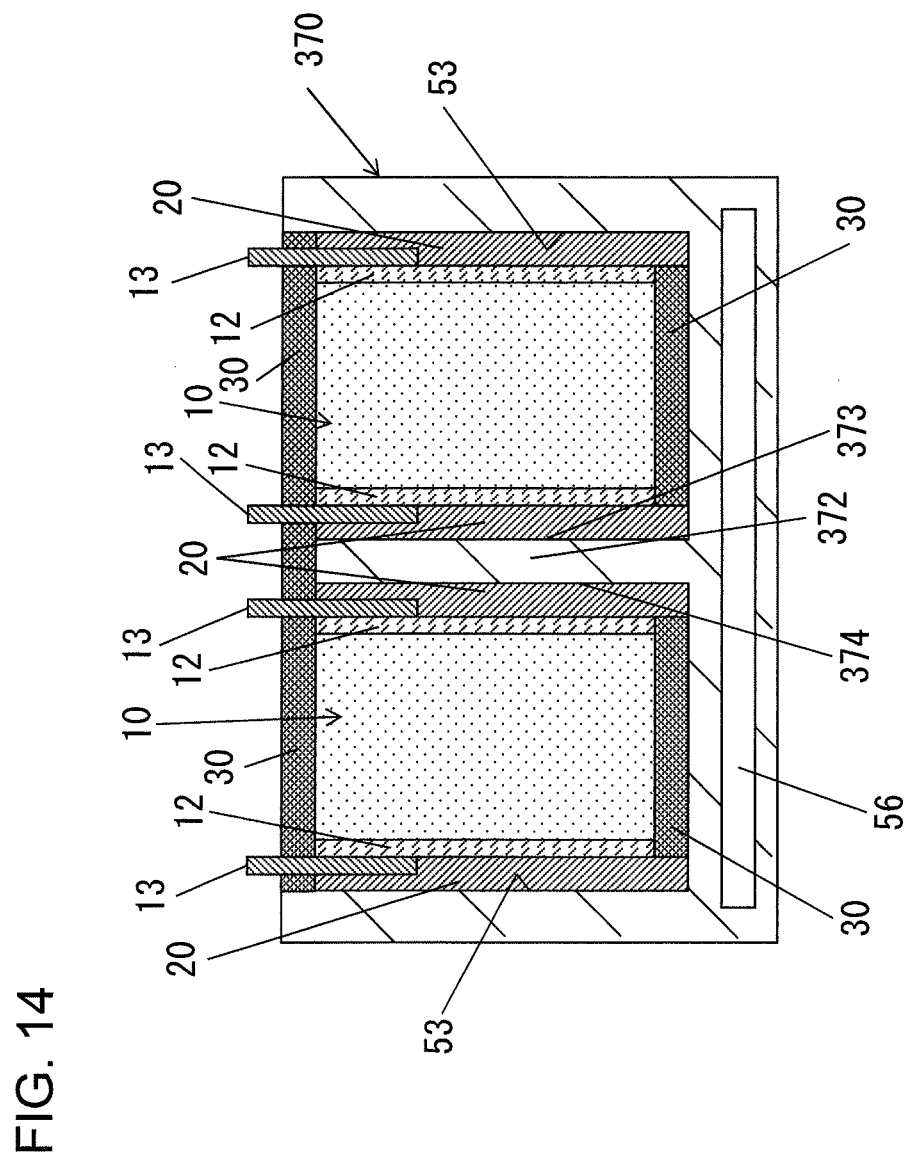
FIG. 14 is a sectional view of FIG. 13 taken in a sectional plane shown by the arrows X7-X8.

Referring to FIGS. 13 and 14, a capacitor device and an electrical power conversion device according to a fourth embodiment of the present invention will now be explained. In the following explanation, to structural elements that are the same as in the first through the third embodiments, the same reference symbols are appended, and the explanation will principally focus upon the points of difference. Features that are not particularly explained are the same as in the first through the third embodiments. In this embodiment, principally, the aspect by which it differs from the third embodiment is the feature that a plurality of film capacitor elements are housed within the same case.

FIG. 13 is a figure for this fourth embodiment, schematically showing a cross section of a case 370 in which two film capacitor elements 10 and three power semiconductor modules 70 are received, taken in a sectional plane that is parallel to a conductor plate 360. And FIG. 14 is a sectional view of FIG. 13 taken in a sectional plane shown by the arrows X7-X8. In this embodiment, the capacitor housing portion 51 is partitioned by a partition wall 372 into a first capacitor housing portion 51a and a second capacitor housing portion 51b. The partition wall 372 is formed integrally with the case 370. In other words, the partition wall 372 is cast integrally with the case 370. The partition wall 372 extends between a pair of opposing inner walls 53 and parallel to those opposing inner walls 53.

A film capacitor element 10 is housed in the first capacitor housing portion 51a so that, via a pair of inserts 20, its pair of collector electrodes 12, 12 oppose one of the pair of opposing inner walls 53 and one wall surface 373 of the partition wall 372 that faces into the first capacitor housing portion 51a. And another film capacitor element 10 is housed in the second capacitor housing portion 51b so that, via another pair of inserts 20, its pair of collector electrodes 12, 12 oppose the other one of the pair of opposing inner walls 53 and the other wall surface 374 of the partition wall 372 that faces into the second capacitor housing portion 51b. And, in a similar manner to the case with the first embodiment, a mass of sealing and insulating material 30 is charged into the gaps in the first capacitor housing portion 51a and into the gaps in the second capacitor housing portion 51b.

It should be understood that the beneficial effects of the inserts 20 of the first capacitor housing portion 51a and the second capacitor housing portion 51b are the same as described in connection with the first embodiment.

With the inverter device 300 of this embodiment, the following further beneficial operational effects are also available, in addition to the beneficial effects provided by the first through the third embodiments.

(1) In this structure, it is arranged to partition the capacitor housing portion 51 between a pair of opposing inner walls 53 into the first capacitor housing portion 51a and the second capacitor housing portion 52b with the partition wall 372 that extends parallel to the opposing inner walls 53. And one of the film capacitor elements 10 is disposed in each of these capacitor housing portions 51a and 51b, with its pair of collector electrodes 12 facing one of the opposing inner walls 53 and one of the wall surfaces 373 or 374 of the partition wall 372 via the inserts 20.

Due to this, it is possible to make the distances between the collector electrodes 12 and the opposing inner walls 53 or the wall surfaces 373 or 374 as small as possible, while still ensuring the necessary insulation characteristic. In other words, it is possible to reduce the thicknesses of the layers of sealing and insulating material 30 between the collector electrodes 12 and the opposing inner walls 53 or the wall surfaces 373 or 374, and thus it is possible to reduce the thermal resistance of these insulating material layers. Due to this, even if a plurality of the film capacitor elements 10 are housed in the capacitor housing portion 51, still the heat generated by these film capacitor elements 10 can easily be transmitted to the case 370 that is structured to be cooled by the cooling medium, so that the performance for cooling the film capacitor elements 10 is enhanced, whereby the durability of the inverter device 300 is improved.

(2) Since the partition wall 372 is cast integrally with the case 370, in other words the partition wall 372 is a metallic plate that is formed integrally with the case 370, accordingly the heat generated by the film capacitor elements 10 is easily transmitted to the partition wall 372 and to the opposing inner walls 53 via the collector electrodes 12 and the layers of sealing and insulating material 30. Due to this, it becomes easy for the heat generated by the film capacitor elements 10 to be transmitted to the case 370 that is structured so as to be cooled by the cooling medium, so that the cooling performance for the film capacitor elements 10 is enhanced and thereby the durability of this capacitor device 100 is enhanced.

Figure 15:
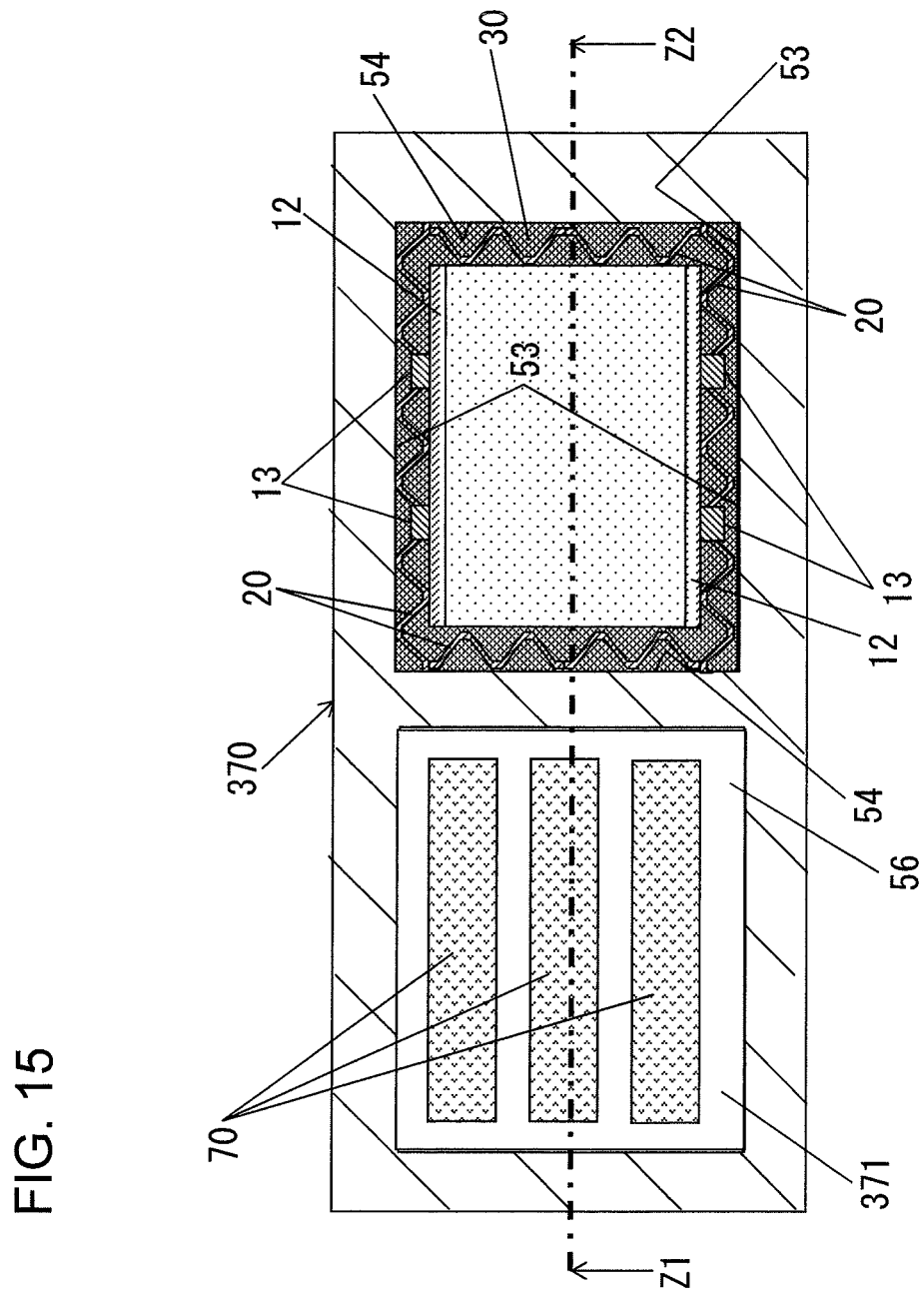
FIG. 15 is a figure showing a variant embodiment.
Figure 16:
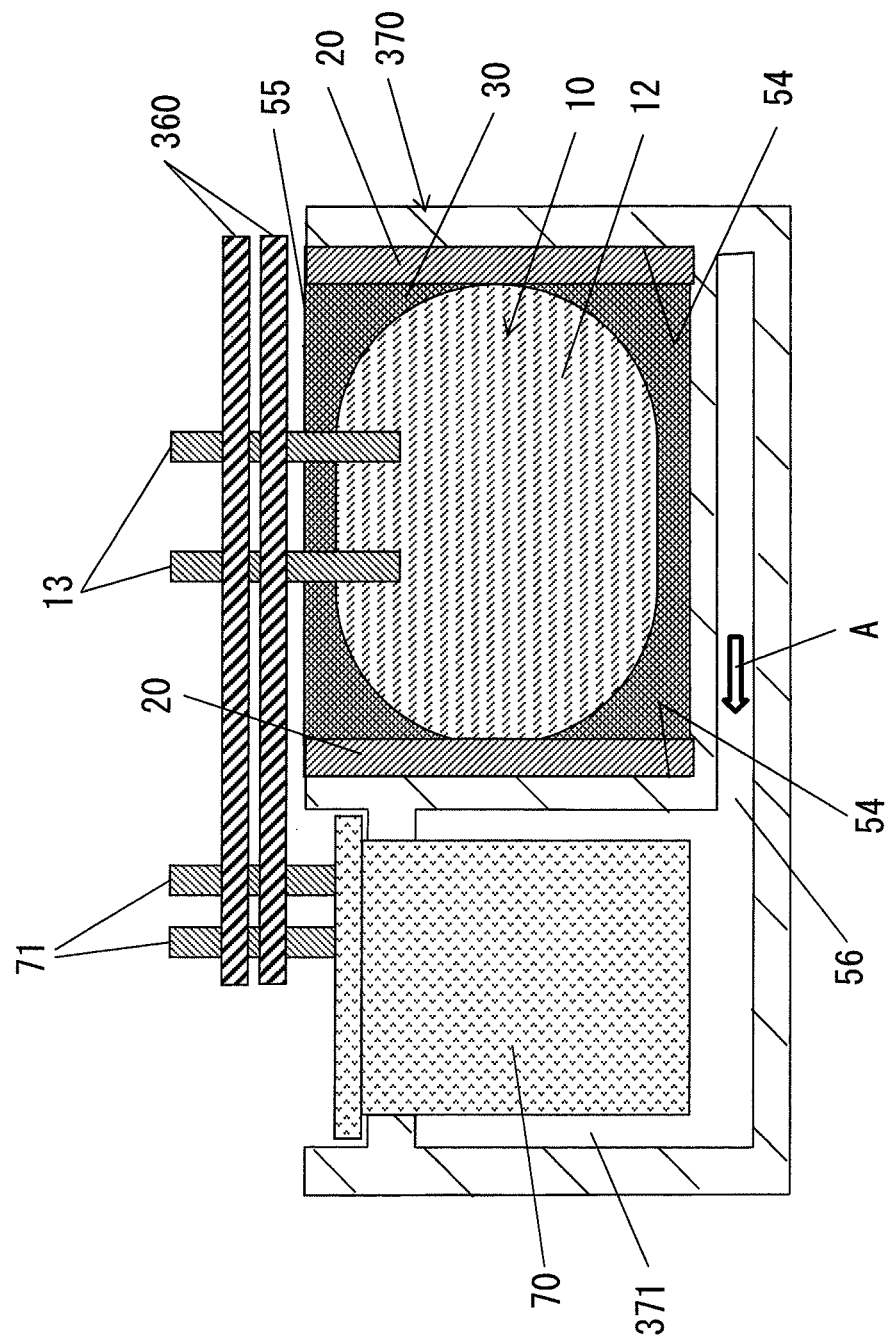
FIG. 16 is a figure showing another variant embodiment.

VARIANT EMBODIMENTS (1) While, in the above explanation, the inserts 20 were only inserted between the collector electrodes 12 and the wall surfaces of the capacitor housing portion 51, the present invention is not to be considered as being thereby limited. For example, as shown in FIGS. 15 and 16, it would also be possible to arrange to insert inserts 20, not only between the collector electrodes 12 and the opposing inner walls 53, but also between the sides of the film capacitor element 10 where no collector electrodes 12 are present and the inner walls 54 that are orthogonal to the opposing inner walls 53. It should be understood that FIG. 15 is a figure schematically showing a cross section of a case 370 in which one film capacitor element 10 and several power semiconductor modules 70 are received, taken in a sectional plane that is parallel to a conductor plate 360. Moreover, FIG. 16 is a sectional view of FIG. 15 taken in a sectional plane shown by the arrows Z3-Z4.

By providing this type of structure, it is possible to perform positional determination of the film capacitor element 10, not only between the pair of opposing inner walls 53, but also between the pair of inner walls 54 that are orthogonal to the opposing inner walls 53. Accordingly, the amount of variation of the position of the film capacitor element 10 within the capacitor housing portion 51 between different examples of the capacitor device 100 and different examples of the inverter device 300 becomes smaller. Since due to this, for example, the amount of variation in the positions of the terminals 13 with respect to the conductor plate 360 to which these terminals 13 are connected becomes smaller, accordingly the reliability of the electrical connections between the conductor plate 360 and the terminals 13 is improved, so that the reliability of the inverter device 300 is enhanced.

(2) While, in the above explanation, the inserts 20 were described as being made from a material such as resin or the like that is electrically insulating, the present invention is not to be considered as being limited by this feature. For example, it would also be acceptable to arrange to make the inserts 20 by using a metallic material as the core material for the inserts 20, and by covering the surfaces of this core material with a resin material that is both insulating and flexible. In this case, it would also be acceptable to arrange to provide the necessary elasticity for the inserts 20 by taking advantage of the core metallic material.

Moreover, in a similar manner, in the second embodiment described above, it would also be possible to arrange to produce the inserts 60 by using a metallic material as the core material for the inserts 60, and by covering the surfaces of this core material with a resin material that is both insulating and flexible. It would be possible to enhance the thermal conductivity of the inserts 60 by employing this type of structure.

Figure 17B:
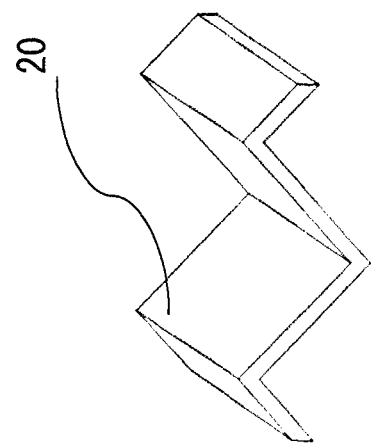
FIGS. 17A and 17B are figures showing yet another variant embodiment.
Figure 17A:
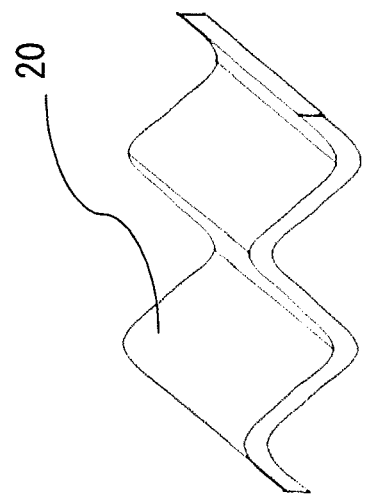

(3) While, in the above explanation, as shown in the sectional view of FIG. 4B that is taken in a sectional plane shown by the arrows X1-X2, the portions that correspond to the hills on the wavy plate shape of the insert 20 had flattened tops, the present invention is not to be considered as being limited by this feature. For example, as shown in FIG. 17A, it would also be possible to form the portions corresponding to the hills on the wavy plate shape of the insert 20 as rounded hummocks. Moreover, as shown in FIG. 17B, the surfaces that lead from the hills to the valleys on the wavy shape of the insert 20 and from the valleys to the hills thereon need not be shaped in smooth wavy curves, but may be formed as planar portions. Furthermore, the shape of the inserts 20 is not to be considered as being limited to the shapes described above. As the inserts 20, it will be acceptable to employ any members that are insulating and that have been processed into appropriate concave-convex shapes, provided that, when compressed in the thickness direction, they can create elastic force between the collector electrodes 12 and the opposing inner walls 53 to push them apart, and provided that it is easy to charge the sealing and insulating material 30 into the gaps between the collector electrodes 12 and the inserts 20, and into the gaps between the opposing inner walls 53 and the inserts 20.

(4) While, in the above explanation, the inserts 20 and 60 were described as being elements that are integrally formed, this is not to be considered as being limitative of the present invention. For example, it would also be acceptable to form the inserts 20 or the inserts 60 as combinations of a plurality of separate pieces. In concrete terms, for example, each of the inserts 20 or the inserts 60 could be divided into two parts, and, during use, these parts could be employed by combining both of them to form a single insert 20 or 60.

(5) While water was cited in the above explanation as an example of a cooling medium, the present invention is not to be considered as being limited thereby; it would also be acceptable to arrange to employ some other cooling medium, such as a liquid other than water, or a gas such as air or the like.

(6) While in the above explanation, by way of example, the cases 50 and 370 were described as being made by aluminum casting, this is only an example; they could be made using some other metallic material.

(7) While, in the fourth embodiment described above, the capacitor housing portion 51 was partitioned by the partition wall 372 into the first capacitor housing portion 51a and the second housing portion 51b, this is not to be considered as being limitative of the present invention. For example, by providing a plurality of partition walls 372, it would also be possible to partition the capacitor housing portion 51 into three or more chambers, in each of which a film capacitor element 10 would be housed.

(8) All or some of the various embodiments and variant embodiments described above may also be combined in any appropriate manner.

It should be understood that the present invention should not be considered as being in any way limited by the embodiments described above, that are only given by way of illustration; the present invention also includes capacitor devices having various other structures, such as a capacitor device, includes: a film capacitor element that includes a coiled body in which an insulating layer and an electrification layer are laminated and wound together, and a pair of collector electrodes that are formed upon two opposite end faces of the coiled body; a case that includes a capacitor housing portion within which the film capacitor element is received; a pair of inserts having insulation properties, one of which is inserted between one of the pair of collector electrodes and one of inner walls of the capacitor housing portion; and a mass of sealing and insulating material that is charged between the film capacitor element and the one of the inner walls of the capacitor housing portion, wherein: the inner walls of the capacitor housing portion include a pair of mutually opposing inner walls, each of which confronts one of the pair of collector electrodes; each of the pair of inserts is inserted between one of the pair of mutually opposing inner walls and corresponding one of the pair of collector electrodes, and has an electrode side facing surface that confronts the corresponding one of the pair of collector electrodes and a case side facing surface that confronts the one of the pair of mutually opposing inner walls; on the electrode side facing surface, there are provided electrode side contact portions that contact the corresponding one of the pair of collector electrodes and electrode side isolated portions that are separated from the corresponding one of the pair of collector electrodes; on the case side facing surface, there are provided case side contact portions that contact the one of the pair of mutually opposing inner walls and case side isolated portions that are separated from the one of the pair of mutually opposing inner walls; and the sealing and insulating material is charged between the corresponding one of the pair of collector electrodes and the electrode side isolated portions, and between the one of the pair of opposing inner walls and the case side isolated portions.

Moreover, the present invention should not be considered as being in any way limited by the embodiments described above, that are only given by way of illustration; the present invention also includes electrical power conversion devices having various other structures, such as an electrical power conversion device, including: a capacitor device according to the above; a power semiconductor module that converts between DC electrical power and AC electrical power; and a plate shaped conductor plate where a circuit is formed that electrically connects between the power semiconductor module and the film capacitor element, wherein: the case is formed in a shape of a box having a bottom but no lid, and an aperture for receiving the film capacitor and the inserts is formed at an upper surface of the capacitor housing portion; the film capacitor element includes capacitor terminals that electrically connect the collector electrodes and the conductor plate; the capacitor terminals project vertically from the aperture of the case; and the conductor plate is disposed parallel to the upper surface of the case.

What is claimed is:

1. A capacitor device, comprising:
a film capacitor element that comprises a coiled body in which an insulating layer and an electrification layer are laminated and wound together, and a pair of collector electrodes that are formed upon two opposite end faces of the coiled body;
a case that comprises a capacitor housing portion within which the film capacitor element is received;
a pair of inserts having insulation properties, one of which is inserted between one of the pair of collector electrodes and one of inner walls of the capacitor housing portion; and
a mass of sealing and insulating material that is charged between the film capacitor element and the one of the inner walls of the capacitor housing portion, wherein:
the inner walls of the capacitor housing portion include a pair of mutually opposing inner walls, each of which confronts one of the pair of collector electrodes;
each of the pair of inserts is inserted between one of the pair of mutually opposing inner walls and corresponding one of the pair of collector electrodes, and has an electrode side facing surface that confronts the corresponding one of the pair of collector electrodes and a case side facing surface that confronts the one of the pair of mutually opposing inner walls;
on the electrode side facing surface, there are provided electrode side contact portions that contact the corresponding one of the pair of collector electrodes and electrode side isolated portions that are separated from the corresponding one of the pair of collector electrodes;
on the case side facing surface, there are provided case side contact portions that contact the one of the pair of mutually opposing inner walls and case side isolated portions that are separated from the one of the pair of mutually opposing inner walls;
the sealing and insulating material is charged between the corresponding one of the pair of collector electrodes and the electrode side isolated portions, and between the one of the pair of opposing inner walls and the case side isolated portions;
the case is formed in a shape of a box having a bottom but no lid, and an aperture for receiving the film capacitor and the pair of inserts is formed in an upper portion of the capacitor housing portion;
the one of the pair of mutually opposing inner walls is a wall portion that is inclined inwards in a tapered shape so as to become narrower in a direction from the aperture towards a bottom surface of the capacitor housing portion; and
the each of the pair of inserts is formed in a tapered shape in the direction from the aperture towards the bottom surface of the capacitor housing portion, so that it becomes thinner along a thickness direction of the corresponding one of the pair of collector electrodes.

2. A capacitor device according to claim 1, wherein:
the each of the pair of inserts biases the corresponding one of the pair of collecting electrodes and the one of the pair of mutually opposing inner walls in a direction to separate each other due to elasticity thereof.

3. A capacitor device according to claim 1, wherein:
a thermal conductivity of the pair of inserts is higher than a thermal conductivity of the sealing and insulating material.

4. A capacitor device according to claim 3, wherein:
the film capacitor element is supported by the pair of inserts in a state in which the film capacitor element is separated from the bottom surface of the capacitor housing portion; and
the sealing and insulating material is charged between the film capacitor element and the bottom surface of the capacitor housing portion.

5. A capacitor device according to claim 1, wherein:
at least a portion of the case is made from a metallic material.

6. A capacitor device according to claim 1, wherein:
the case is further formed with a cooling medium passage in which a cooling medium for cooling flows.

7. An electrical power conversion device, comprising:
a capacitor device according to claim 1;
a power semiconductor module that converts between DC electrical power and AC electrical power; and
a plate shaped conductor plate where a circuit is formed that electrically connects between the power semiconductor module and the film capacitor element, wherein:
the case is formed in a shape of a box having a bottom but no lid, and an aperture for receiving the film capacitor and the inserts is formed at an upper surface of the capacitor housing portion;
the film capacitor element comprises capacitor terminals that electrically connect the collector electrodes and the conductor plate;
the capacitor terminals project vertically from the aperture of the case; and
the conductor plate is disposed parallel to the upper surface of the case.

8. An electrical power conversion device according to claim 7, wherein:
the case comprises a power semiconductor module housing portion that is provided adjacent to the capacitor housing portion and separated therefrom by an inner wall different from the mutually opposing inner walls, and in which the power semiconductor module is housed, and a cooling medium passage in which a cooling medium for cooling flows; and
the cooling medium passage includes an upstream side passage portion that is provided adjacent to the capacitor housing portion with intervention of a bottom plate that constitutes the bottom surface of the capacitor housing portion, and a downstream side passage portion that conducts the cooling medium to a side surface of the power semiconductor module.

9. An electrical power conversion device according to claim 8, wherein:
the case comprises a partition wall, provided between a pair of mutually opposing inner walls, that partitions the capacitor housing portion into at least a first capacitor housing portion and a second capacitor housing portion;
film capacitor elements each corresponding to the film capacitor element are provided, and are respectively housed in the first capacitor housing portion and the second capacitor housing portion that are partitioned by the partition wall, with one of the collector electrodes facing one of the opposing inner walls or the partition wall; and
one of the inserts is inserted between one of the collector electrodes and one of the opposing inner walls, or between one of the collector electrodes and the partition wall.

10. An electrical power conversion device according to claim 7, wherein:
an insert is further inserted between a side of the film capacitor element that is orthogonal to the collector electrodes, and an inner wall of the capacitor housing portions that confront the side of the film capacitor.

* * * * *